United States Patent [19]

Nilssen et al.

[11] 4,313,038

[45] Jan. 26, 1982

[54] DTMF SIGNAL RECEIVER

[75] Inventors: Albert G. Nilssen, Cupertino; Spencer L. Hermanson, Mountain View, both of Calif.

[73] Assignee: Wescom, Inc., Downers Grove, Ill.

[21] Appl. No.: 122,563

[22] Filed: Feb. 19, 1980

Related U.S. Application Data

[62] Division of Ser. No. 951,516, Oct. 13, 1978, Pat. No. 4,219,699.

[51] Int. Cl.³ ............................................. H04M 1/50
[52] U.S. Cl. ................................................ 179/84 VF
[58] Field of Search ........... 179/84 R, 84 VF, 16 EC; 328/138

[56] References Cited

U.S. PATENT DOCUMENTS

| | | | |
|---|---|---|---|
| 3,140,468 | 7/1964 | Blaisdell et al. | 179/84 T |
| 3,764,753 | 10/1973 | Wisotzky | 179/84 VF |
| 3,894,197 | 7/1975 | Cowplano et al. | 179/84 T |
| 3,909,549 | 9/1975 | Tarridec et al. | 179/84 VF |
| 3,931,474 | 1/1976 | McLaughlin et al. | 179/16 AA |
| 3,959,603 | 5/1976 | Nilssen et al. | 179/84 VF |

OTHER PUBLICATIONS

Issue 1, Dec. 1970, AT & T Co., Standard, "SS-3 Touch Tone Selective Signaling System".

Primary Examiner—John H. Wolff
Assistant Examiner—J. A. Popek
Attorney, Agent, or Firm—Leydig, Voit, Osann, Mayer & Holt, Ltd.

[57] ABSTRACT

A DTMF signal receiver, for telephone systems, includes an amplifier with automatic gain control for receiving and amplifying DTMF and audio signals. A series of bandpass and notch filters receive the output from the amplifier for producing bandpass and notch outputs in response to the DTMF frequencies. A detector receives the bandpass output from each of the filters to produce a signal representing the presence or absence of a signal of each DTMF frequency in the amplifier output, and a DTMF decoder receives the signals from all such detectors and produces output signals in response to simultaneous detection of preselected pairs of DTMF frequencies. A voice guard circuit receives the notch output from the last filter in the series and compares the amplitude of that notch output with a threshold level to produce a disable signal whenever the amplitude of the notch output is greater than the threshold. This disable signal is supplied to the DTMF decoder for disabling the production of output signals by the decoder and thereby preventing the detection of invalid DTMF signals.

3 Claims, 11 Drawing Figures

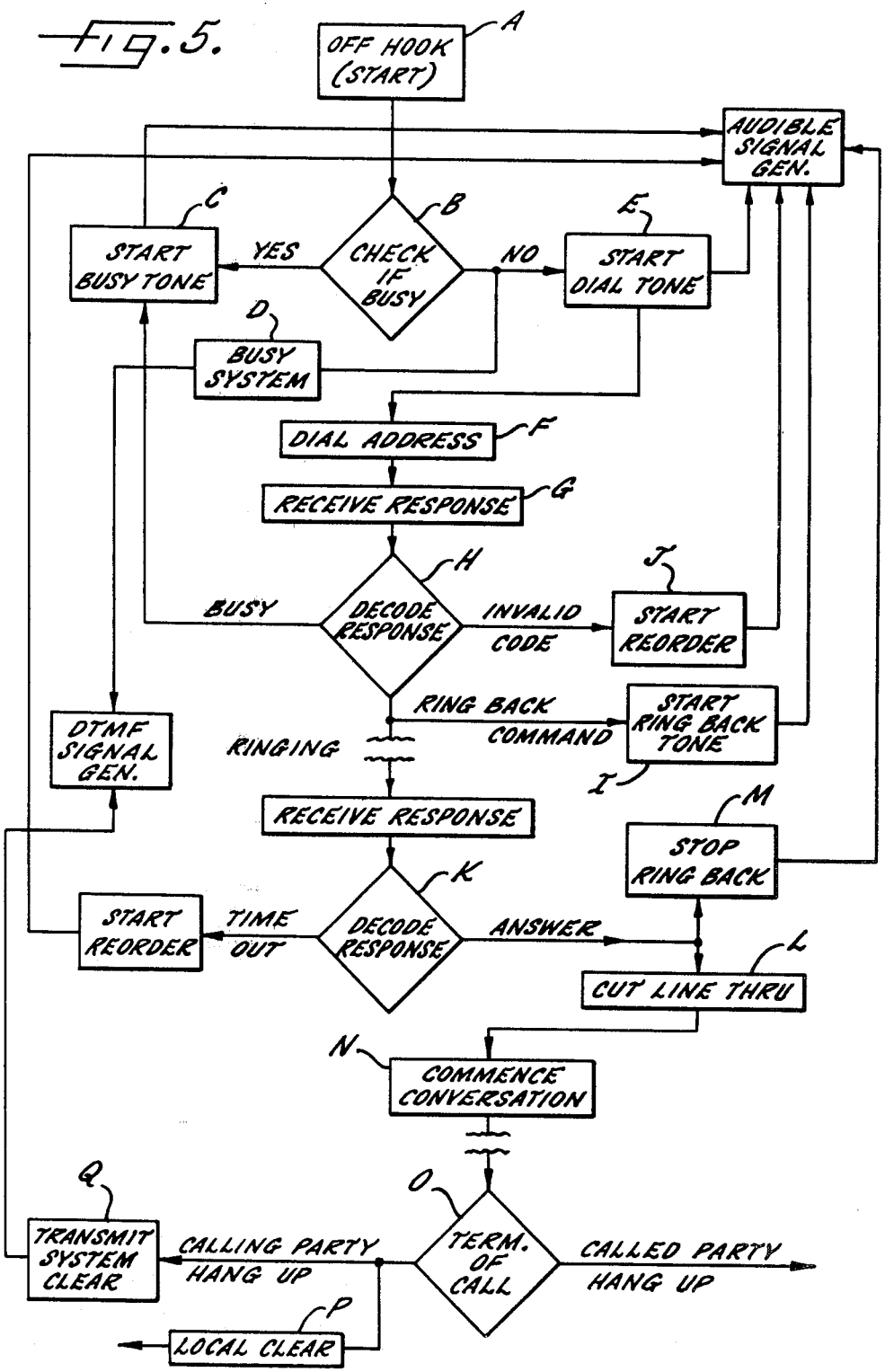

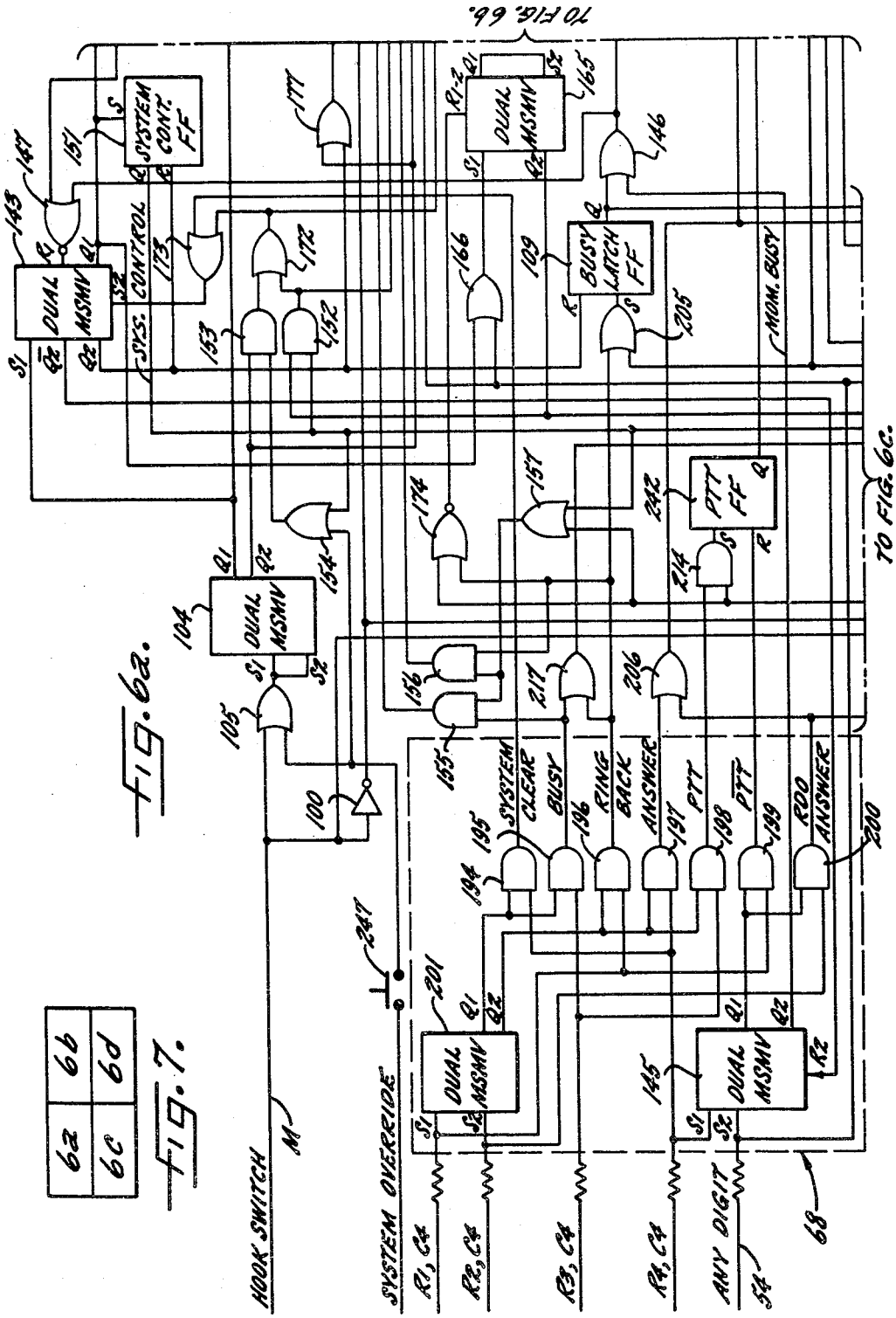

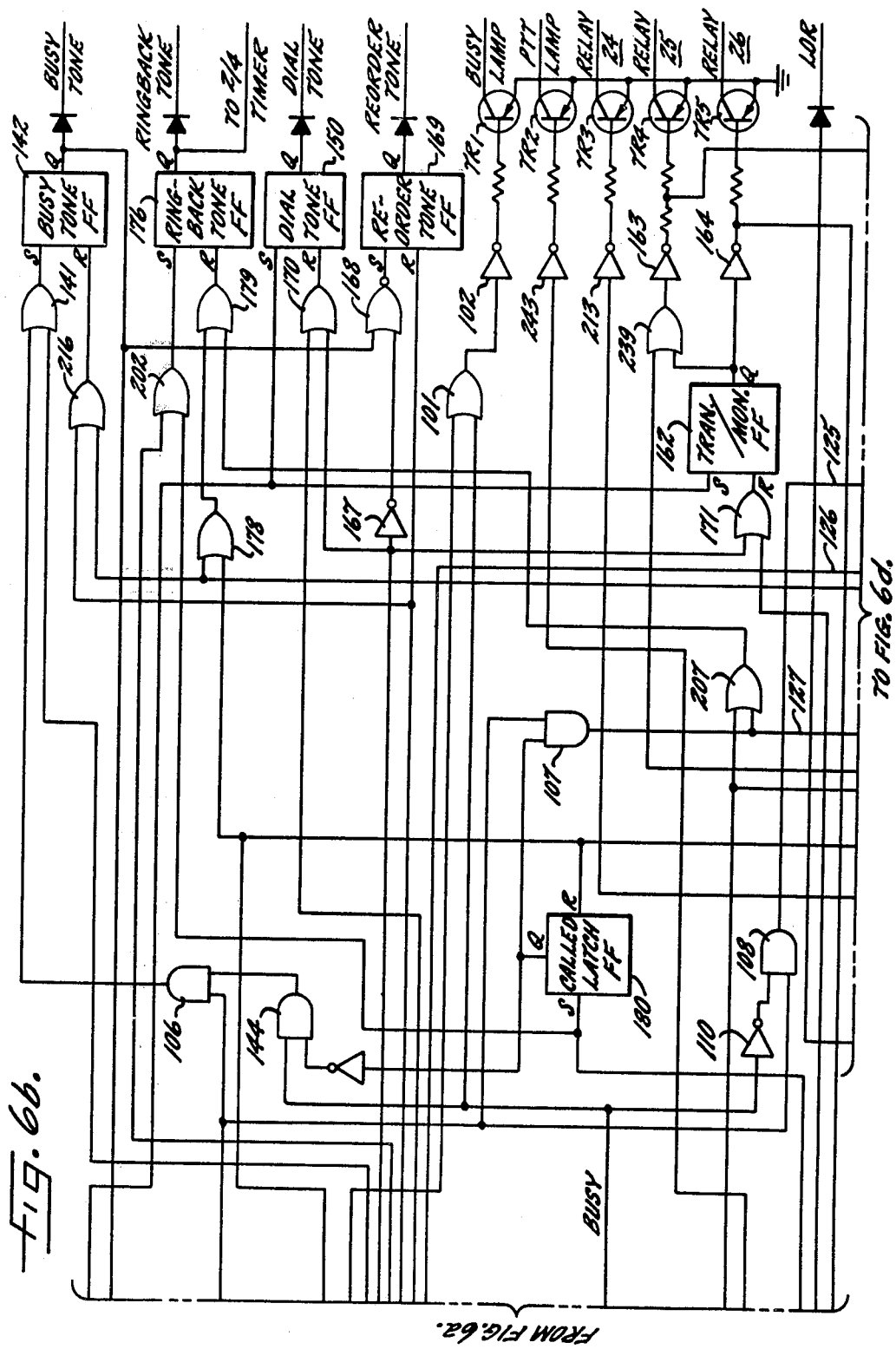

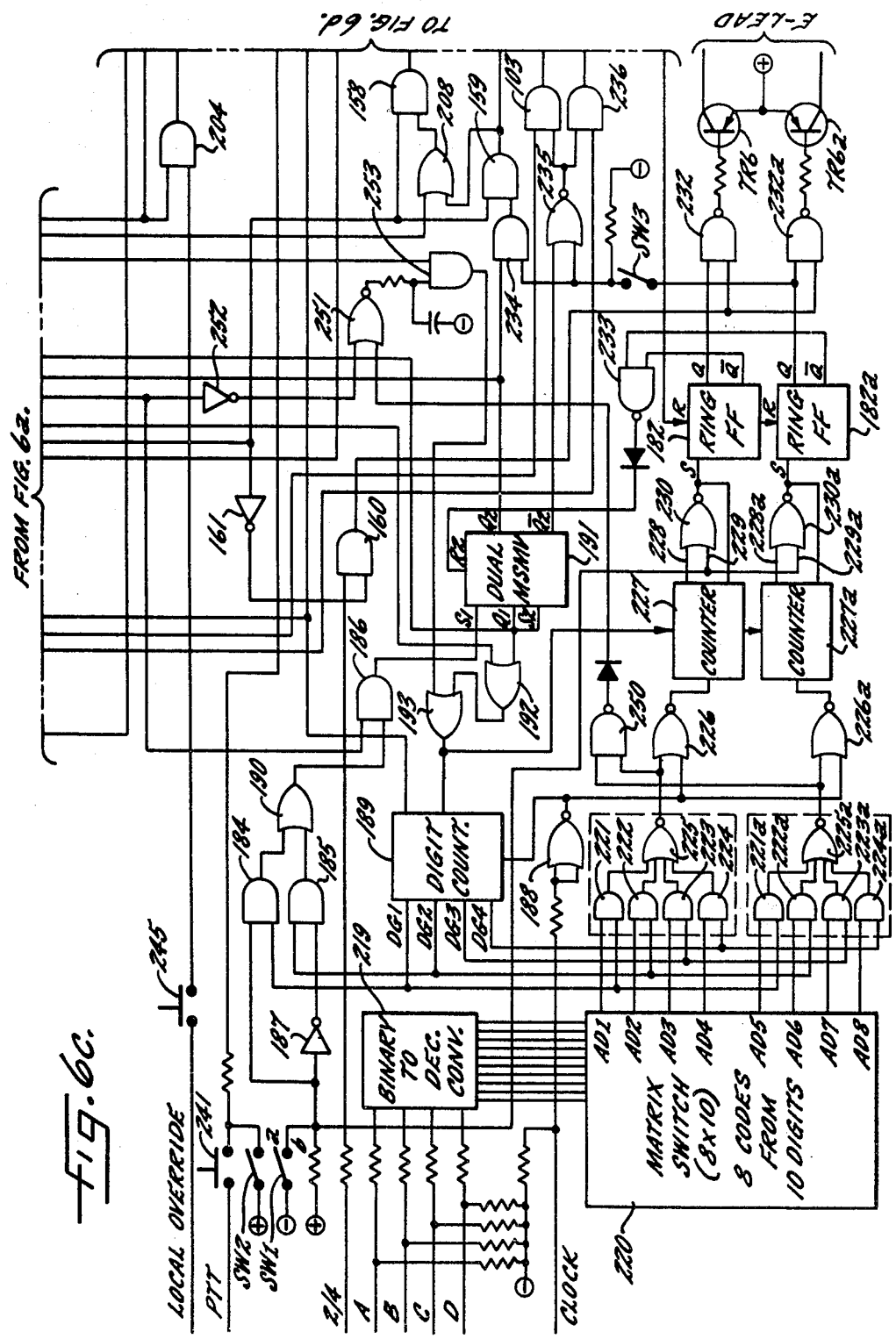

DTMF SIGNAL RECEIVER

This is a division of application Ser. No. 951,516 filed 10/13/78 now U.S. Pat. No. 4,219,699.

DESCRIPTION OF THE INVENTION

The present invention relates generally to telephone systems and, more particularly, to telephone systems of the type that utilize dual-tone-multiple-frequency (DTMF) signals for addressing purposes.

In telephone systems, the term "supervisory signal" generally refers to the signals that initiate the standard audible signals heard by the calling party. These audible signals are typically the dial tone, the busy tone, the ringback tone, and the reorder tone. The dial tone normally consists of a combination of 350 Hz and 440 Hz; the busy tone is a combination of 480 Hz and 620 Hz interrupted at 60 IPM (on 0.5 second, off 0.5 second) to indicate that the called line is busy; the ringback tone is 440 Hz modulated by 480 Hz (on 2.0 seconds, off 4.0 seconds) to indicate that the called line has been reached and ringing has started; and the reorder tone is a combination of 480 Hz and 620 Hz interrupted at 120 IPM (on 0.2 second, off 0.3 second) to indicate that the called line should be re-dialed.

The two supervisory control systems that are most prevalent in telephone systems today are known as "E and M" and "SF". Both these systems respond to supervisory signals produced by subscribers' on-hook and off-hook conditions to produce the standard audible signals from central office equipment. The "E and M" system relies on d-c. supervisory signals which cannot be transmitted over wireless systems as required in mobile communications, microwave systems, satellite systems and the like. The "SF" system relies on a continuous supervisory signal of fixed frequency (typically 2600 Hz.) which ties up communication channels that could otherwise be used, dissipates power (e.g., in satellites) even when not being used for supervisory functions, and requires continuous filtering to remove the supervisory signal from the voice signals being transmitted therewith.

It is a primary object of the present invention to provide an improved telephone system that includes all normal station-to-station supervision and selective addressing, regardless of the transmission medium or media, and that uses the internationally standard dual-tone-multiple-frequency (DTMF) signaling format.

More specific objects of the invention are to provide such an improved telephone system that does not require the filtering of supervisory signals from the audio signals being transmitted, and that provides full supervisory control, including generation of the standard audible signals, directly at the subscriber stations so that the supervision system can be completely independent of the central office.

Another object of the invention is to provide such an improved telephone system that is universally compatible with two-wire or four-wire telephone lines; push-to-talk mobile radio and passive satellite systems, including simplex systems; microwave systems, including microwave orderwire; or any combination thereof in a single system.

It is a further object of this invention to provide a universal system of supervision in telephone systems in which the supervisory signals are capable of being transmitted via wireless transmission media, and are not transmitted continuously so that only a minimum amount of power is used for transmission of the supervisory signals.

Still another object of the invention is to provide such an improved telephone supervision system that can be used in a system that already has conventional "E and M" or "SF" supervisory control without either system interfering with the other.

It is yet another object of the invention to provide such an improved telephone supervision system that utilizes a common DTMF signaling system for both addressing and supervisory functions, thereby providing a relatively simple system that can be efficiently and economically manufactured and maintained.

A further object of the invention is to provide a DTMF signal receiver that provides improved discrimination between valid and invalid DTMF signals.

Other objects and advantages of the invention will be apparent from the following detailed description and the accompanying drawings, in which:

FIG. 1 is a block diagram of two subscriber stations in a telephone system embodying the invention;

FIGS. 2a and 2b taken together comprise a more detailed schematic diagram of one of the DTMF receivers included in the system of FIG. 1;

FIG. 5 is a flow chart illustrating the operation of the controller shown in FIG. 4 in a calling mode;

Figure 4:
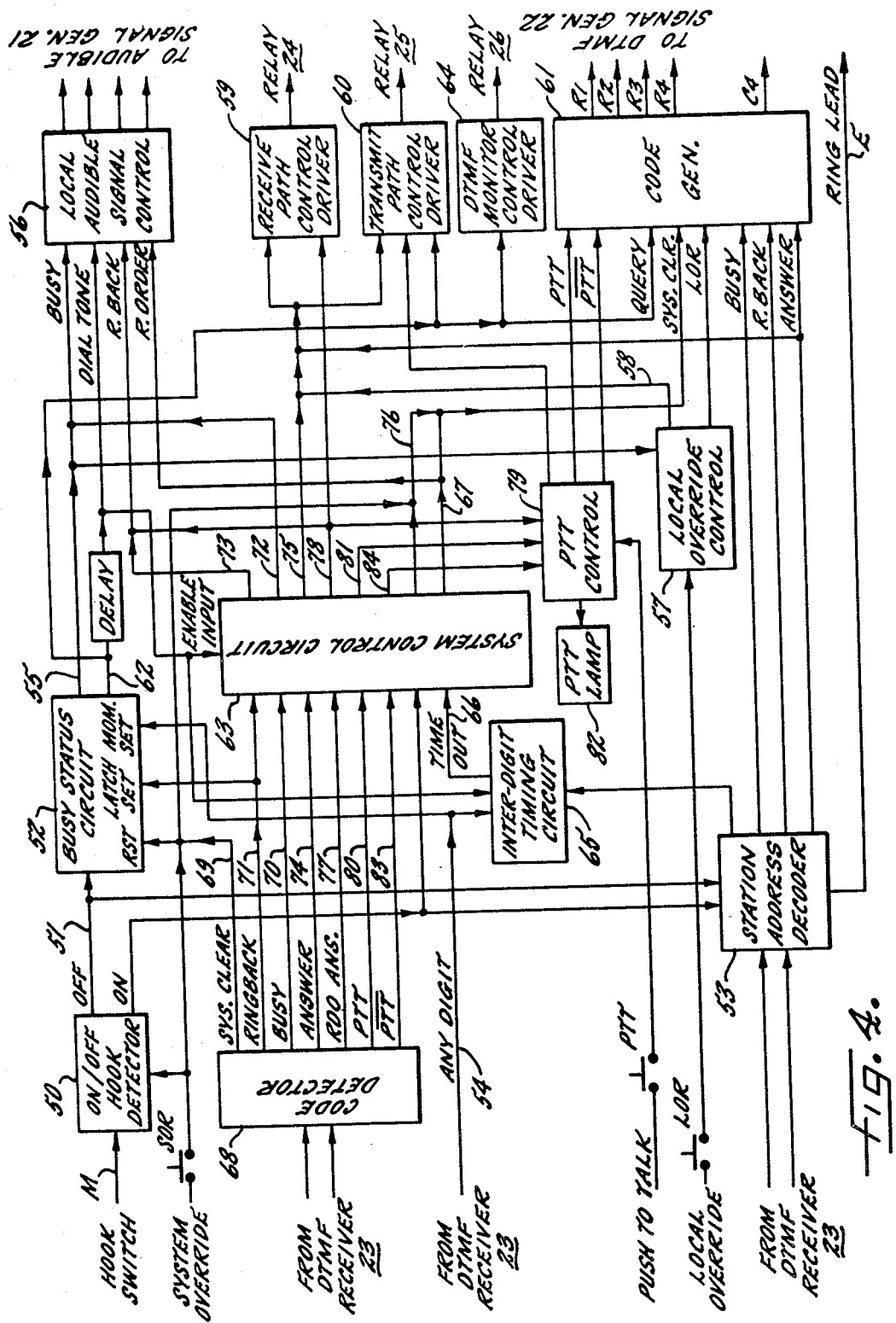
FIG. 4 is a block diagram of one of the controllers included in the system of FIG. 1.
Figure 6D:
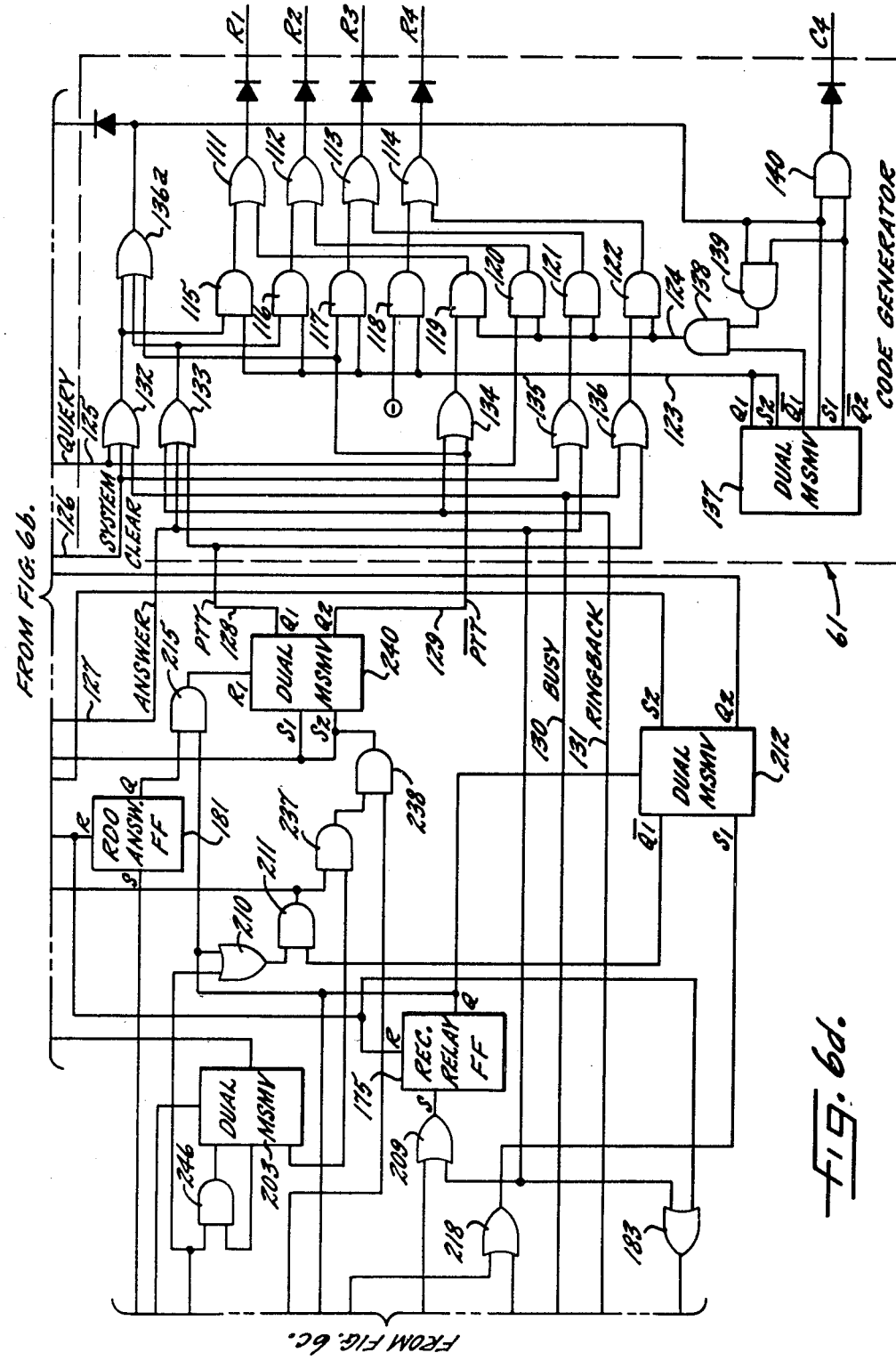

FIGS. 6a through 6d when joined together comprise a detailed schematic diagram of the controller shown in FIG. 4; and FIG. 7 is a chart illustrating how the four FIGS. 6a through 6d should be joined together to form a single schematic diagram of the controller.

Although the invention will be described in connection with certain preferred embodiments, it will be understood that it is not intended to limit the invention to these particular embodiments. On the contrary, it is intended to cover all alternatives, modifications and equivalents as may be included within the spirit and scope of the invention as defined by the appended claims.

Figure 1:
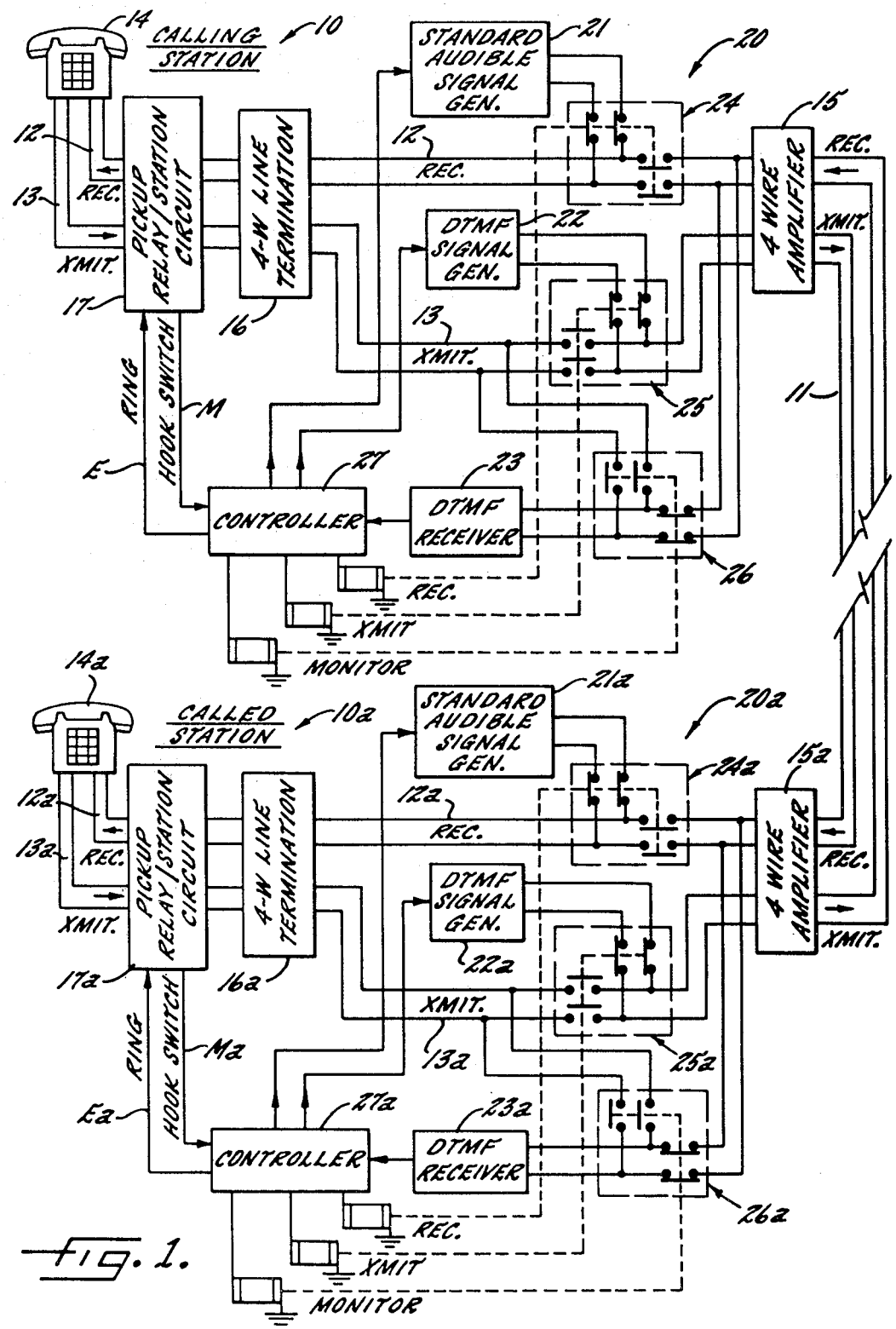

Turning now to the drawings and referring first to FIG. 1, a portion of a telephone system is illustrated by a pair of subscriber stations 10 and 10a interconnected by a transmission medium or media 11. The transmission medium 11 may include a two-wire or four-wire line, a microwave system, a mobile radio system, a communication satellite, or any combination of such media. At each subscriber station, the transmission medium 11 interfaces with a receive line 12 or 12a and a transmit line 13 or 13a connected to a handset 14 or 14a. The interface between the transmission medium 11 and the subscriber handset includes a four-wire amplifier 15, a four-wire line termination 16, and a pickup relay/station circuit 17, all of which are standard telephone equipment.

The four-wire line amplifier 15, the four-wire line termination 16, and the pick-up relay-station circuit 17, are all standard commercially available units. For example, the units 15, 16 and 17 may be Wescom models 401, 402 and 405, respectively, manufactured by Wescom, Inc., Downers Grove, Illinois.

The telephone handsets 14 and 14a at the stations 10 and 10a are of the DTMF type, including 3×4 matrices of manually operable pushbuttons which control the generation of DTMF addressing signals. As is well known in the telephone art, a complete address comprises a prescribed sequence of dual-tone signals, each comprising a combination of a low frequency signal (either 697, 770, 852 or 941 Hz) and a high frequency signal (either 1209, 1336 or 1477 Hz). The 3×4 matrix permits the selection of 12 different dual-tone signals, i.e., frequency pairs, identified on the pushbuttons by the ten digits 0–9 and the symbols "*" and "#".

A fourth high frequency, i.e., 1633 Hz, is often available internally in such equipment, thereby expanding the matrix to 4×4 and expanding the number of available frequency pairs or dual-tone signals from 12 to 16. The four additional signals are normally used only for special functions, such as controlling alarms and the like.

In accordance with one important aspect of the present invention, each subscriber station includes a standard audible signal generator connected to the receive drop for generating dial tone, ringback tone, reorder tone, and busy tone in response to supervisory DTMF signals; and control means connected to both the transmit and receive lines for effecting the generation of the supervisory DTMF signals and thereby controlling the generation of the dial tone, ringback tone, reorder tone, and busy tone in response to selected conditions on the transmit and receive lines. Thus, in the illustrative system, a pair of transponders 20 and 20a are associated with the two stations 10 and 10a. Each transponder includes (1) a standard audible signal generator 21 capable of generating a conventional dial tone, busy tone, ringback tone and re-order tone, (2) a DTMF signal generator 22 for generating supervisory DTMF signals for transmission to stations remote from the particular station associated with the DTMF signal generator, (3) a DTMF signal receiver 23 for detecting and identifying DTMF signals from both the local station and remote stations, (4) a plurality of relays or other switching devices 24, 25 and 26, and (5) a controller 27 for controlling the relays 24–26 and the generators 21 and 22 in response to signals from the receiver 23 and M lead (hook switch).

During the dialing and ringing stages of a call, the relay 24 in the transponder at the calling station 10 connects the receive drop 12 to the audible signal generator 21 and disconnects that receive drop 12 from receive line 11. If and when the addressed station answers, and only then, the relay 24 is energized to disconnect the signal generator 21 from the receive drop 12 and to "cut through" the receive path so that the only signals received at the calling station are those received from the amplifier 15.

At the called station 10a, the relay 24a is energized whenever that station comes "off hook" in response to ringing created by the decoded sequence of DTMF digits representing the unique address at that particular station. There is no need for the generation of any of the standard audible signals at the called station 10a, and thus there is no need for the audible signal generator 21a to ever be connected to the receive drop at the called station. When the called party hangs up, the resulting on-hook signal at that station de-energizes the relay 24a to restore the transponder 20a at that station to its normal condition whereby the audible signal generator 21a is connected to the receive drop 12a.

The second relay 25 is associated with the DTMF signal generator 22 and the transmit path, and normally opens the transmit path and connects the generator 22 to the transmit line 11. However, when the calling station goes off hook, the relay 25 at that station is energized during the dialing of the prescribed number of address digits from the handset 14 so that these digits can be transmitted to the called station. The relay 25 is de-energized upon dialing out of the last address digit, and is re-energized again only if the called station answers.

At the called station, the relay 25a is energized when that station answers, as indicated by an off-hook signal.

The third relay 26 controls whether the DTMF receiver 23 is connected to the receive or transmit side of the line 11, i.e., whether the receiver 23 monitors incoming or outgoing DTMF signals. At the calling station, the relay 26 initially connects the receiver 23 to the receive side of the line 11 to detect any incoming busy signals. When a dial tone is initiated, the relay 26 is energized to connect the receiver 23 to the transmit line so that the receiver monitors the DTMF digits being dialed out. After the requisite number of digits for a valid address are dialed out, the relay 26 is de-energized again so that the receiver 23 is re-connected to the receive side of the line 11 to "listen" for a response from the called station, and the relay remains in this state for the balance of the call.

At the called station there is no need for the DTMF receiver 23a to ever monitor an outgoing signal, and thus the relay 26a is never energized.

Control of the three relays 24–26, as well as the generators 21 and 22, is effected by a controller 27 which receives encoded versions of the incoming DTMF signals from the receiver 23, as well as a hook switch signal on the conventional "M" lead from the handset. The signal on the "M" lead always represents either an "on-hook" or an "off-hook" condition. In addition, the controller 27 controls ringing of the handset 14 via the conventional "E" lead to the ringing circuit.

The audible signal generator 21 per se is conventional, including four free-running oscillators for generating the four frequencies (350, 440, 480 and 620 Hz) utilized in the dial tone, busy tone, ringback tone, and reorder tone. The outputs of these four oscillators are coupled to the relay 24 via audio switches (e.g., MC 14066) which are controlled by the signals from the controller 27 and three free-running clock generators for controlling the timing of the on and off intervals of the busy, ringback, and reorder tone. More specifically, the controller 27 furnishes signals to four different inputs in the generator 21, each of which actuates the audio switches associated with the oscillators that generate the two frequencies for different ones of the four tones. When the "dial tone" input is energized, the 350 Hz and 440 Hz oscillators are coupled to the relay 24 to produce a continuous tone. The other three inputs couple the oscillators needed for the busy, ringback and reorder tones to the relay 24, but the enabling signals are passed through AND gates that are controlled by the respective clock generators so that the tones are interrupted at the prescribed intervals, i.e., 2.0 sec. on - 4.0 sec. off for the ringback tone, and 0.2 sec. on - 0.3 sec. off for the reorder tone. The DTMF signal generator 22 may be an integrated circuit type MC14410 manufactured by Motorola Inc., Schaumburg, Illinois. It will be appreciated that the DTMF generator 22 has input lines representing the four rows R1R4 (i.e., the low frequencies 697, 770, 852 and 941 Hz) and the four columns C1–C4 (i.e., the high frequencies 1209, 1336, 1477 and 1633 Hz) of a 4×4 DTMF matrix. To produce a DTMF signal, the generator 22 must be furnished with input signals on the two input lines corresponding to the row and column of the desired DTMF signal. For example, a DTMF signal corresponding to the position of the digit "1" on a conventional handset requires input signals on the R1 and C1 input lines.

In accordance with a further aspect of the invention, the DTMF receiver comprises a series of bandpass and notch filters receiving the DTMF and audio signals from an AGC amplifier for producing bandpass and notch outputs in response to the prescribed DTMF frequencies; a plurality of detection means each receiving the bandpass output from one of the filters for producing signals representing the presence or absence of a signal of each prescribed DTMF frequency in the output from the AGC amplifier; a DTMF decoder receiving the signals from the detection means and producing output signals in response to the simultaneous detection of preselected pairs of the prescribed DTMF frequencies; and a voice guard circuit receiving the notch output from the final filter and comparing the amplitude of that notch output with a predetermined threshold level for producing a disable signal whenever the amplitude of the notch output is above the predetermined threshold level, the disable signal being supplied to the DTMF decoder for disabling the production of an output by that decoder and thereby preventing the detection of invalid DTMF signals. Thus, in the illustrative embodiment, the DTMF receiver includes a series of bandpass and notch filters 31–38 which sequentially receive the output from the AGC amplifier. More specifically, each successive filter receives the notch output signal from the preceding filter, and each of the eight filters 31–38 is tuned to one of the eight prescribed DTMF frequencies so that the notch outputs of the eight filters successively eliminate signals with these eight prescribed frequencies. The notch output, of course, includes the entire range of audio frequencies (20 to 20,000 Hz) except the particular frequency to which the filter is tuned; conversely, the bandpass output includes only the particular frequency to which the filter is tuned.

Figure 3:
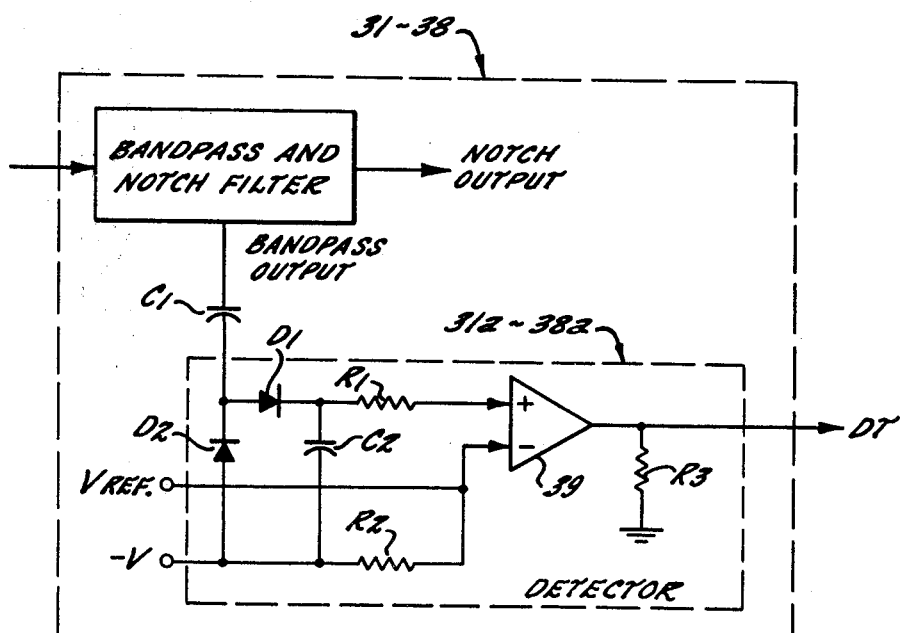
FIG. 3 is a more detailed schematic diagram of one of the filter-detector circuits included in the DTMF receiver shown in FIGS. 2a and 2b.

For the purpose of producing a signal representing the presence or absence of each prescribed DTMF frequency, the bandpass outputs of the filters 31–38 are passed through respective detectors 31a–38a, each of which comprises a rectifying circuit feeding the non-inverting input of a comparator 39 (FIG. 3). More particularly, the bandpass output of each filter is passed through a d-c.-blocking capacitor C1 to a pair of half wave-rectifying diodes D1 and D2 and then on through an integrating or smoothing circuit formed by a resistor R1 and capacitor C2 for smoothing the half wave-rectified signal. Thus, the voltage applied to the non-inverting input of the comparator 39 is essentially a d-c. signal, the magnitude of which is proportional to the amplitude of any signal component entering the corresponding bandpass and notch filter with the particular frequency to which that filter is tuned.

The inverting input of the comparator 39 receives a d-c. reference signal produced by the voltage across a resistor R2 connected between a reference voltage source $V_R$ and a common voltage level $-V$.

Thus, whenever the signal received by one of the filters 31–38 includes a component with the particular frequency to which the filter is tuned, which is one of the prescribed DTMF frequencies, the magnitude of the d-c. signal applied to the non-inverting input of the comparator 39 exceeds the magnitude of the reference signal supplied to the inverting input. This causes the output of the comparator 39 to go "low" indicating the presence of a signal with the prescribed DTMF frequency.

These output signals from the detectors 31a–38a associated with the eight different filters 31–38 are supplied to a binary encoder 40 (FIG. 2a) which produces a different four-bit binary output signal in response to each different pair of the eight input signals representing the eight DTMF frequencies. That is, each of the eight inputs to the binary encoder 40 is a binary signal representing the presence or absence of one of the eight DTMF frequencies, as indicated by the frequencies noted on the eight input lines to the encoder in FIG. 2a. The encoder 40 responds to the sixteen possible two-frequency combinations of these input signals to produce a four-bit binary output signal on its four output lines. That is, each four-binary output signal represents a different DTMF signal comprising a particular two-frequency combination of input signals that has been detected. For example, the four-bit binary output signal 1001 would correspond to the DTMF signal representing the digit "9", which is represented by the combination of the two frequencies 852 Hz. and 1447 Hz. Thus, the sixteen possible different four-bit output signals from the encoder represent the sixteen possible DTMF signals (i.e., different frequency pairs) in binary form.

From the encoder 40, the four bits of the binary output signal are passed through four corresponding AND gates G1–G4 and then on through four corresponding drivers 41–44 to the output lines A, B, C and D, respectively. The four binary signals are also passed through an OR gate 45 and a fifth driver 46 to generate a fifth output signal representing the presence of "any" DTMF signal except the signal representing the digit "0".

The binary outputs for a detected digit "0" are all low and thus a separate "any" digit must be created for that digit. The two frequencies 941 Hz and 1209 Hz, comprising the "0" digit, are detected by a separate AND gate G5 connected to the detectors 34a and 36a associated with the corresponding filters 34 and 36. When both these frequencies are detected, the output of the AND gate G5 goes high and is passed through the OR gate 45 to produce an output signal from the driver 46. Thus, it will be appreciated that the driver 46 produces an output signal on line 54, in response to any detected DTMF signal, and accordingly is referred to as the "any digit" signal.

It is well known that invalid DTMF tones can be accidentally included in the audio signals and/or in unwanted noise signals that enter a telephone system. Valid DTMF signals, on the other hand, are normally transmitted in the absence of an audio signal. This fact is used as a premise for checking the validity of the output signals from the detectors 31a–38a associated with the eight filters 31–38. More particularly, a "voice guard" circuit is used to determine whether any of the DTMF frequencies are detected simultaneously with the detection of an audio signal. If so, a series of gates are disabled to block any output signals from the receiver indicating the detection of a DTMF signal.

Figure 2A:
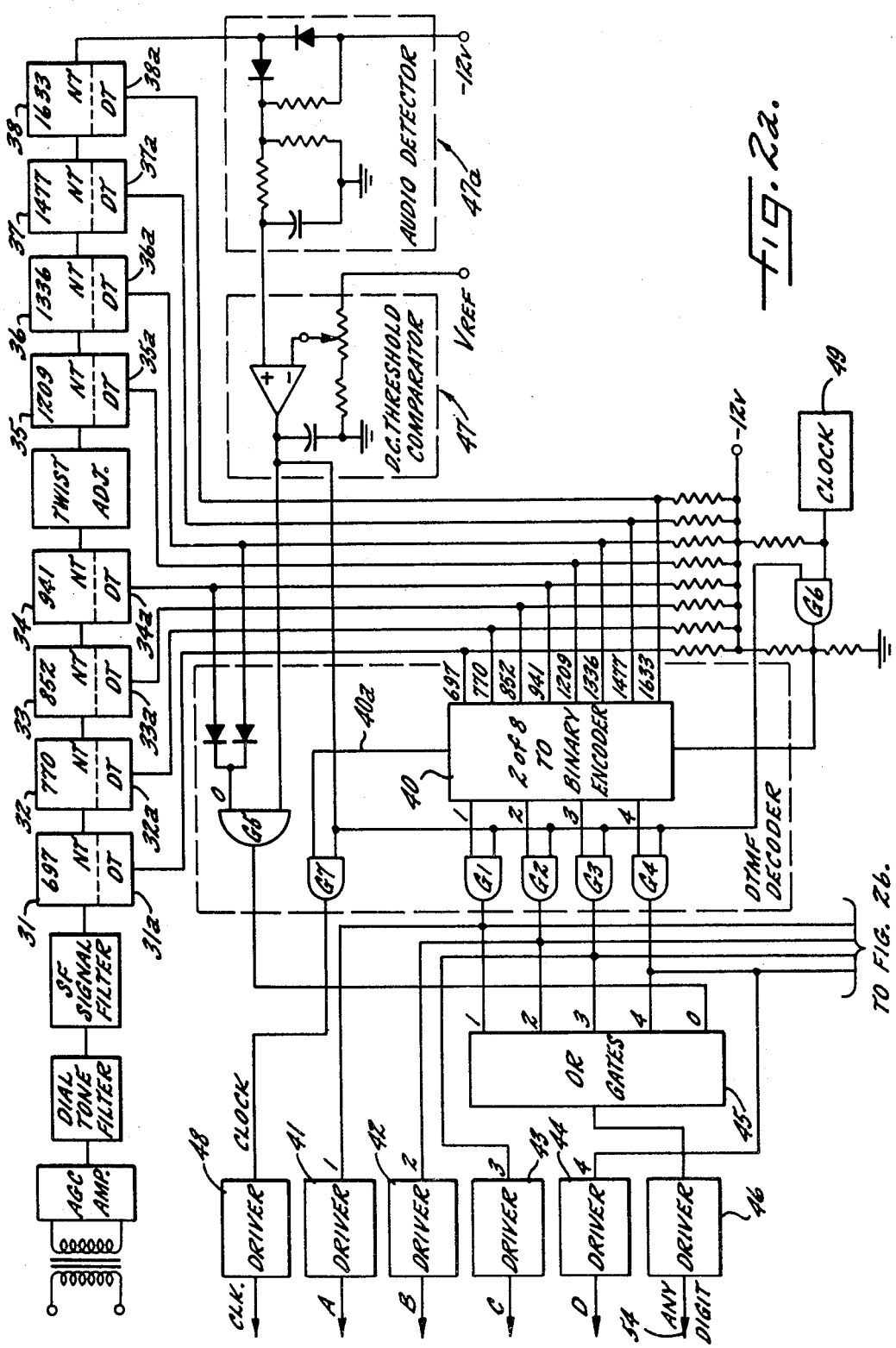
Figure 2B:
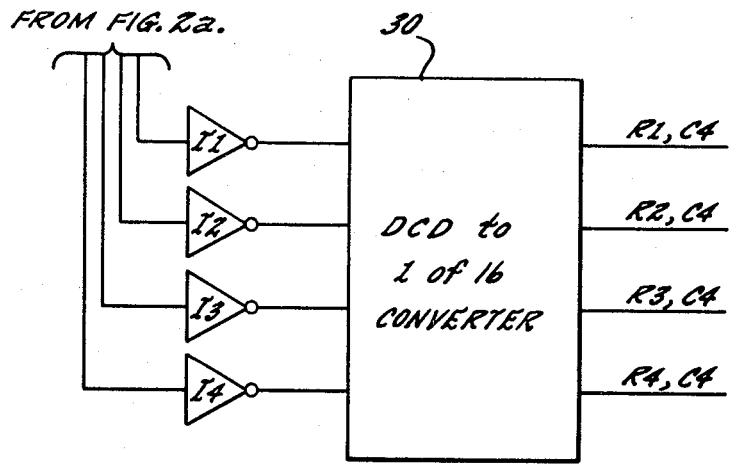

In the particular DTMF receiver shown in FIG. 2a, the "voice guard" circuit includes an audio detector 47a which generates a d-c. signal with a magnitude proportional to the amplitude of the notch output from the final filter 38. This d-c. signal is then supplied to the non-inverting input of a comparator 47, with the inverting input of the comparator receiving a reference signal which is adjustable to establish a variable threshold level. This threshold level is set slightly above the noise level in any given system, so that the output of the comparator 47 goes high only when the magnitude of the d-c. signal from the audio detector 47a is above the level of the d-c. reference signal representing the noise threshold, indicating that an audio signal is present. In the absence of an audio signal, the only signals remaining in the notch output from the last filter 38 are noise, which will not trigger an output from the comparator 47 because the threshold level of the comparator is deliberately set above the maximum anticipated noise level.

Whenever the output of the comparator 47 goes high, it disables (1) the four AND gates G1–G4 that receive the output of the encoder and (2) the AND gate G5 that detects the sixteenth DTMF frequency pair. Thus, even if a DTMF frequency pair is detected, it does not result in an output signal from the receiver 23. Conversely, the AND gates G1–G5 are all enabled as long as the d-c. output of the audio detector 47a remains above the threshold level of the comparator 47.

As a further check on the validity of the detected DTMF signals, the binary encoder 40 generates a clock signal in response to a predetermined number of pulses from a clock generator. This clock signal is passed through a driver 48 so that it can be used in the controller 27 to determine whether or not the DTMF signals supplied to the eight inputs of the binary encoder 40 lasted long enough to be recognized as valid. In this connection, it should be noted that a valid DTMF signal is always generated for a prescribed time period so that the duration of such signals can be used as a subsequent check on their validity. Thus, the binary encoder 40 successively counts a predetermined number of pulses from a clock generator 49, thereby measuring a prescribed time interval, and a clock pulse is generated on line 40a at the end of each such time interval. The four-bit binary output signals from the encoder 40 are always produced upon coincidence of the two DTMF signals responsible for each binary output, so if any such output signal is dropped prior to the generation of the clock pulse, that particular binary output signal is construed as representing an invalid DTMF signal. The clock pulses are also passed through AND gate G6 and G7 that are controlled by the output of the comparator 47 in the same manner as the other AND gates G1–G5.

The outputs of the four AND gates G1–G4 are also used to generate a second set of output signals from the receiver 23, representing the 16 possible DTMF signals in decimal form. Thus, the outputs of the four AND gates G1–G4 are passed through inverters I1–I4 (FIG. 2a) to a binary-to-decimal converter 30 which produces an output signal on one of 16 output lines in response to a binary input signals representing any of the 16 possible DTMF signals.

The Controller

The portion of the transponder embodied in the controller 27 is shown in the form of a functional block diagram in FIG. 4 accompanied by a flow chart in FIG. 5, and a preferred embodiment of the controller is shown in more detail in the schematic diagram of FIGS. 6a–6d (FIG. 7 illustrates how FIGS. 6a–6d should be pieced together to form a single schematic diagram.)

Turning first to FIGS. 4 and 5, when a calling station initially goes off-hook, a signal is produced by the hook switch on an M lead connected to an on/off hook detector 50. In response to an on/off hook condition, the detector 50 produces an off-hook signal (point A in FIG. 5) which is supplied via line 51 to a busy status circuit 52 (decision point B in FIG. 5) and a station address decoder 53.

In order to prevent a "glare" problem due to two or more stations coming off-hook at the same time and trying to call the same station or each other, there is a brief "query" period between an off-hook condition at any given station and initiation of a dial tone at that station. This "query" period is so short that it is not even noticed by the party coming off-hook, but it provides sufficient time for the busy status circuit to respond to a "query" signal already transmitted from another station, and to transmit its own "query" signal if the system is not already busy.

If the DTMF receiver 23 receives a query signal from another station within the query period, that signal produces an "any digit" output from the receiver 23 on line 54. This "any digit" signal is supplied to the "momentary set" input of the busy status circuit 52 to produce a momentary "busy" control signal on line 55 which triggers a busy tone command signal from a local audible signal control circuit 56 (point C in FIG. 5), and also enables a local override control circuit 57. The busy tone command signal activates the audible signal generator to produce a busy tone at the calling station. In this situation the calling party can either hang up or exercise the local override option by depressing a pushbutton LOR on the handset.

If the local override option is exercised by depressing the pushbutton LOR, the local override control circuit 57 produces a signal on line 58 which activates a receive path control driver 59 and a transmit path control driver 60 to energize the receive and transmit relays 24 and 25. Energization of these relays "cuts through" both the receive and transmit lines for this particular station so that it can communicate with all other stations which are already active in the system. To alert those other stations to the fact that an overrider is present, the local override control circuit 57 also causes a code generator 61 to send a signal to the DTMF signal generator 22 so that a short burst of a preselected DTMF signal is transmitted to the entire system at brief intervals, e.g., every two seconds. To permit the transmission of the DTMF signal, the local override control circuit 57 delays the activation of the drivers 59 and 60 slightly, and then periodically de-activates those drivers for brief intervals to de-energize the transmit relay 25. This connects the DTMF signal generator 22 to the line 11 at spaced intervals to produce the desired short bursts of the DTMF "local override" signal.

If the system is not already busy when the calling station comes off-hook, the busy status circuit 52 produces a "not busy" signal on line 62 which produces a "query" code signal from the code generator 61 and a corresponding signal in DTMF form from the DTMF signal generator 22 (point D in FIG. 5). The same signal supplied to the code generator 61 also activates the transmit path and "DTMF monitor" control drivers 60 and 64 to energize the corresponding relays 25 and 26. Thus, the "query" signal from the generator 22 momentarily busies all other stations in the system via their "any digit" lines 54, while the calling station originating the query signal proceeds to dial out the desired address. After a short delay to permit transmission of the query signal, the signal on line 62 enables a system control circuit 63; triggers a "dial tone" command signal from the local audible signal control circuit 56 (point E in FIG. 5) to activate the generator 21 to produce a dial tone at the calling station and activates a timing circuit 65 to initiate a timing cycle.

Activaton of the timing circuit 65 starts a timing cycle which allows the calling party only a prescribed time interval, e.g., 5 seconds, to begin dialing out an address. If the dialing does not start within this prescribed interval, the timing circuit 65 produces a time-out signal on line 66 which resets the system control circuit 63 to produce a signal on line 67 which (1) triggers the local audible signal control circuit 56 to send a reorder tone command signal to the audible signal generator 21 and thereby produce a reorder tone at the calling station and (2) produces a "system clear" code signal from the code generator 61 to transmit a corresponding signal in DTMF form from the generator 22 to reset all other stations in the system. At all stations other than the calling station, this "system clear" code signal is detected by the DTMF receiver 23 and passed on to a code detector 68. The code detector in turn produces a signal on line 69 which resets the busy status circuit 52 at all such stations. Thus, the entire system is cleared, with the exception of the calling station which continues to receive the reorder tone until the calling party hangs up and starts over with a new off-hook signal.

Within the prescribed time interval allowed by the timing circuit 65, energization of the transmit relay 25 permits the calling party to start dialing out a sequence of DTMF address digits (point F in FIG. 5), with the DTMF receiver 23 at the calling station monitoring the digits being dialed out on the transmit line 13 due to the energization of relay 26. Each time a DTMF digit is dialed out, the receiver 23 produces an "any digit" signal which momentarily re-busies the calling station transponder (including termination of the dial tone) and also re-triggers the timing circuit 65 to start another timing cycle exactly like the one initiated by the "not busy" signal. If excessive time elapses between the dialing of any pair of successive digits, the timing circuit 65 times out and produces a time-out signal on line 66, as already described above. The calling party must then hangup and start dialing again in order to place a call.

At the called station, the dialed DTMF digits are detected by the DTMF receiver 23, which is connected to the receive side of the transmission line 11 by the relay 26 in its de-energized state. The receiver 23 transmits the valid DTMF signals to the station address decoder 53, which determines whether any sequence of received DTMF signals represents the address of that particular station. If a valid address is detected, the decoder 53 at that station energizes the E lead to initiate ringing at the called station, and also triggers the code generator 61 to transmit either a "busy" or a "ringback" code signal (depending on the condition of the called station as determined by the inputs to the decoder 53 from the on/off hook detector 50) to the DTMF signal generator 22 (point G in FIG. 5). The generator 22 then transmits a corresponding signal in DTMF form to the rest of the system, including the calling station.

The ensuing "busy" or "ringback" DTMF code signal is detected by the DTMF receiver 22 at the calling station and transmitted to the code detector 68 to produce an output signal on line 70 (busy) or 71 (ringback) connected to a corresponding input to the system control circuit 63 (point H in FIG. 5). The latter circuit in turn produces an output signal on line 72 or 73 to trigger a "busy tone" (Point C in FIG. 5) or 37 ringback tone" (point I in FIG. 5) command signal from the local audible signal control circuit 56. Either of these command signals activates the audible signal generator 21 to produce a corresponding tone at the calling station. The ringback signal on line 71 also latches the busy status circuit 52 in a set condition. If the address dialed out is not valid for any station in the system, the timing circuit 65 will time-out and initiate a reorder tone (point J in FIG. 5) and a "system clear" code signal, as already described above.

If the called station answers (point K in FIG. 5), the on/off hook detector 50 sends an off-hook pulse to the decoder 53, which (1) energizes the receive relay 24 via driver 59 to cut through the receive line (point L in FIG. 5), (2) triggers the code generator 61 to transmit an "answer" code signal to the DTMF signal generator 22, and (3) then energizes the transmit relay 25 via driver 60 to "cut through" the transmit line. In response to the "answer" code signal from generator 61, the DTMF signal generator 22 sends an "answer" signal in DTMF form to the rest of the system. At the calling station this DTMF "answer" signal is detected by the receiver 23 and transmitted to the code detector 68 to produce an output signal on line 74 connected to a corresponding input to the system control circuit 63 (point K in FIG. 5). The latter circuit in turn terminates the ringback tone (point M in FIG. 5) and produces an output signal on line 75 to energize both the receive and transmit relays 24 and 25 via drivers 59 and 60 to "cut through" both the receive and transmit lines at the calling station (point L in FIG. 5).

The calling and called stations are now in communication with each other (point N in FIG. 5) and remain so until one or both of the stations goes on hook.

When the called station goes on hook after answering, the resulting on-hook output signal from the detector 50 resets the system control circuit 63, which in turn de-activates the receive and transmit path control drivers 59 and 60, to restore the called station to its original condition (point O in FIG. 5). No change occurs in the transponder at the calling station in response to a hangup at the called station. When the calling station hangs up, however, the resulting on-hook signal from the detector 50 not only resets the system control circuit 63 and both the receive and transmit path control drivers 59 and 60 (point P in FIG. 5), but also produces an output signal on line 76 which causes the code generator 61 to transmit a "system clear" code signal to the DTMF signal generator 22. The signal generator 22 in turn sends a "system clear" signal in DTMF form to the rest of the system to reset all the other stations (point Q in FIG. 5).

After communication has been established between a calling station and an initial called station, either of these stations may dial one or more additional stations to establish a conference call. The resulting "busy" or "ringback" code signal from the third station momentarily connects the receive drop at the calling station to its audible signal generator 21 to receive a short burst of busy or ringback tone from the audible signal generator 21. This gives the calling station an indication of the status of the third station, and then the transponder immediately restores the line of communication between the calling station and the original called station.

The illustrative system also includes a "push-to-talk" operating mode for use in the event that a called station is an unmanned radio site with automatic answering capability. When this type of station is called, it returns a "radio answer" code signal rather than a "busy" or "ringback" code signal.

When the "radio answer" signal is received at the calling station, the code detector 68 produces an output signal on line 77 leading to the corresponding input of the system control circuit 63. The circuit 63 responds to this input to produce an output signal on line 78 leading to a PTT control circuit 79 as well as the "ringback" input to the local audible signal control circuit 56. The latter circuit 56 produces a brief burst of ringback tone at the calling station to indicate that a radio station has been called, while the PTT control circuit 79 conditions the transponder at the calling station for operation in the push-to-talk mode.

The calling party then depresses a push-to-talk button PTT on his handset to trigger the PTT control circuit 79 to produce a PTT signal which causes the code generator 61 to transmit a PTT code signal to the system. This PTT code signal is detected by the DTMF receiver 23 at the called radio site, keys "up" the transmitter, and sends back a PTT code signal. This return signal is detected by the receiver 23 at the calling station and transmitted to the code detector 68 to produce an output signal on line 80 connected to the corresponding input to the system control circuit 63. The circuit 63 in turn produces an output signal on line 81 which causes the PTT control circuit 79 to illuminate a PTT lamp 82 (indicating to the calling party that the radio site is keyed up) and to cut through the transmit path via the driver 60.

When the pushbutton PTT is released, the control circuit 79 de-energizes the transmit relay 25 via driver 60 and also supplies an enabling signal to the $\overline{PTT}$ input to the code generator 61, thereby causing the DTMF signal generator 22 to transmit a corresponding signal in DTMF form. This $\overline{PTT}$ code signal is detected by the DTMF receiver 23 at the called radio site, which then drops the transmitter and returns a $\overline{PTT}$ code signal. More particularly, the code detector 68 at the radio site produces a signal on line 83 leading to the system control circuit 63, which in turn supplies a signal via line 84 to the control circuit 79; the circuit 79 produces a $\overline{PTT}$ input to the code generator 61, causing the DTMF signal generator 22 to transmit a $\overline{PTT}$ code signal in DTMF form. When this $\overline{PTT}$ code signal is received at the calling station, it turns off the PTT lamp 82, indicating that the transmitter is no longer keyed.

The two stations proceed to communicate with each other in this uni-directional manner until the communication is terminated by an on-hook condition at the calling station. As described above in connection with communications between non-radio stations, it is only the on-hook condition at the calling station that generates a "system clear" code signal to reset all other stations in the system.

In addition to the "local override" feature described above, the system illustrated in FIG. 4 includes a "system override" feature. This feature not only gives the initiating party access to the entire system, but also "dumps" or clears every station already in the system. To exercise this option, a handset pushbutton SOR is depressed thereby supplying a simulated off-hook signal to the detector 50, resetting the busy status circuit 52, and supplying a signal to the "system clear" input to the code generator 61. This latter signal causes the code generator 61 to transmit a "system clear" code signal to the DTMF signal generator 22, which in turn sends a "system clear" signal in DTMF form to the rest of the system to reset all the other stations. This clears the entire system for transmissions from the station where the system override was initiated by depressing the pushbutton SOR.

Now that the controller 27 has been described in general terms, the preferred embodiment thereof illustrated in FIGS. 6a–6b will be described in more detail.

The Preferred Controller Circuitry of FIGS. 6a–6d

The "Calling Mode"

When the calling station goes off-hook, the d-c. voltage on the M lead is reduced to an off-hook level and is maintained at that level as long as the station remains offhook. This change in the voltage level on the M lead is used to initiate all the functions that are performed by the transponder in response to an offhook condition, the first of which is to energize a "busy" lamp (not shown) by turning on a transistor TR1 via inverter 100, OR gate 101 and inverter 102. Illumination of this "busy" lamp is simply a visible indication at the calling station that it is off-hook. The off-hook d-c. level on the M lead also provides a steady enabling signal to an AND gate 103 for a purpose to be described below in connection with the "called" mode of the transponder.

With the exception of the "busy" lamp illumination, all the "calling" mode functions of the transponder are initiated by a pulse (rather than a steady d-c. signal) produced by a dual monostable multivibrator 104. Thus, the negative-going change in the voltage level on the M lead in response to an off-hook condition is transmitted via OR gate 105 to an input S1 of the multivibrator 104, which responds to the negative-going change to produce an "off-hook" pulse at an output Q1. This pulse is applied to AND gates 106, 107, and 108. Gate 107 is used only in the "called" mode, and gates 106 and 108 are used only in the "calling" mode.

Turning first to the gate 108, the primary purpose of this gate is to produce the "query" signal for transmission to all other stations in the system when the system is not already busy when the calling station comes off-hook. This query signal momentarily busies all the other stations to prevent the well known "glare" problem due to two stations coming off-hook at the same instant and trying to call the same station or each other.

To this end, if the transponder is not already in a "busy" condition, the gate 108 also receives an enabling "not busy" d-c. signal from an inverter 110 connected to the output Q of a "busy latch" flip flop 109 via OR gate 146 and inverter 110. Thus, the gate 108 passes the off-hook pulse to the "query" input 125 of a code generator 61. This causes the code generator 61 to transmit a pair of closely spaced pulses to the row R1, column C4 and row R2, column C4 inputs of the DTMF signal generator, 22 thereby triggering the generation of successive pulses of the DTMF signals R1,C4 and R2,C4 which are transmitted to all other stations in the system. This particular pair of DTMF signals represent the query signal.

When the query signal is received at any given station, it causes the DTMF receiver 23 at that station to produce an "any digit" signal which momentarily busies that station, as will be described in more detail below. Similarly, if the station transmitting a query signal receives a query signal itself from another station during the query period, the transponder at the station receiving the query signal will produe a busy tone at that station. If a query is not received during the local query period, dial tone will be presented at that station. Consequently, a dial tone can be initiated at only one station in the system at any given time.

Turning now to the internal logic of the code generator 61 to explain how the query signal is generated, it can be seen that the four outputs R1, R2, R3 and R4 (corresponding to the four rows R1-R4 of a DTMF matrix) and connected to the corresponding inputs to the DTMF signal generator 22 are derived from four OR gates 111, 112, 113 and 114, respectively. Each of these four OR gates receives two input signals, one from a first bank of four AND gates 115-118 and the other from a second bank of four AND gates 119-122. The four AND gates in each of the two banks 115-118 and 119-122 correspond respectively to the four outputs R1-R4, but the two banks of AND gates are enabled alternately by pulses on lines 123 and 124 so that the outputs from the OR gates 111-114 are controlled first by the gates 115-118 and then by the gates 119-122. Each time a pulse is received at one of the inputs to the code generator, the four AND gates 115-118 are all enabled simultaneously for a brief interval by a pulse on line 123, and then following a short delay the other four gates 119-122 are all enabled simultaneously for a brief interval by a pulse on the line 124.

It will be noted that the four AND gates 115-118 or 119-122 in each bank are connected to the four output lines R1-R4 via the OR gates 111-114. Thus, if an input is supplied to gate 115 from the "query" input line 125 while that gate is enabled by a pulse on line 123, the resulting output from gate 115 is transmitted through OR gate 111 to line R1 leading to the DTMF signal generator. Similarly, gates 116-118 furnish the signals for lines R2-R4 when an enabling pulse appears on line 123, and gates 119-122 furnish the signals for lines R1-R4 when an enabling pulse appears on line 124.

The other inputs to the eight AND gates 115-122 are derived from the seven input lines 125-131 to the code generator 61, either directly or via one of five OR gates 132-136 which permit multiple input lines to be connected to the same AND gate. The seven input lines 125-131 represent seven different signals to be sent to the DTMF signal generator 22 in the form of two-pulse codes. These two-pulse codes represent different pairs of the four DTMF signals available from the fourth column (1633 Hz.) in the conventional 4×4 DTMF matrix. More specifically, this fourth-column frequency can be combined with any of the four "row" frequencies in the DTMF matrix, namely 698 Hz (R1), 770 Hz (R2), 852 Hz (R3), or 941 Hz (R4). The different pairs of these four DTMF signals which represent the codes for the various signals on the seven input lines 125-131 are as follows:

| Signal | Input Line | Code Output |
| --- | --- | --- |
| query | 125 | R1, C4 + R2, C4 |
| system clear | 126 | R1, C4 + R3, C4 |
| busy | 130 | R1, C4 + R4, C4 |
| ringback | 131 | R2, C4 + R1, C4 |
| answer | 127 | R2, C4 + R3, C4 |
| push-to-talk | 128 | R2, C4 + R4, C4 |

| Signal | Input Line | Code Output |
| --- | --- | --- |
| not push-to-talk | 129 | R3, C4 + R1, C4 |

For example, when an input signal appears on the "query" input line 125, the code generator 61, produces a first pair of output pulses on lines R1 and C4 and a second pair of output pulses on lines R2 and C4, thereby causing the DTMF signal generator to produce a pair of DTMF signals R1, C4 and R2, C4 comprising the query signal. The pulse on line R1 is derived from the input line 125 via OR gate 132, AND gate 115 and OR gate 111. The pulse on line R2 is also derived from the input line 125, but via AND gate 120 and OR gate 112. And of course the two pulses appearing on lines R1 and R2 are spaced by the sequential enabling of the AND gates 115 and 120 by the pulses on lines 123 and 124. In this connection, it will be appreciated that the pulses supplied to the code generator 61 on the seven input lines 125-131 must be wide enough (e.g., 130 ms.) to span the sequential enabling of both banks of AND gates 115-118 and 119-122 by the narrower pulses (e.g., 50 ms.) on lines 123 and 124, so that a single input pulse on one of the seven lines 125-131 will produce two successive output pulses from the two banks of AND gates. In the ensuing description, it will be assumed that a 130-ms. input pulse produces two successive 50-ms. output pulses spaced apart by 30 ms.

Each time a 130-ms. pulse appears on one of the seven input lines 125-131 to the code generator 61, that pulse is also transmitted through an OR gate 136a to an input S1 of a dual monostable multivibrator 137. This input S1 of the multivibrator responds to the positive edge of the incoming pulse to produce a 50-ms. output pulse at the output Q1 connected to line 123. This is the pulse that enables the first bank of AND gates 115-118.

To produce an enabling pulse for the other line 124, the pulse on line 123 is applied to a second input S2 of the dual multivibrator 137 which responds to the negative-going edge of that pulse to produce a 30-millisecond negative pulse at the output $\overline{Q}2$. Meanwhile, the output Q1 goes high at the negative-going edge of the pulse on line 123, enabling an AND gate 138. The second input to the gate 138 is controlled by an AND gate 139 which is disabled by the negative pulse at $\overline{Q}2$, but the width of the disabling negative pulse is only 30 ms. At the end of that 30 ms., the output of gate 139 goes high, causing the output of gate 138 to also go high, until termination of the 130 ms. pulse from gate 136 disables the AND gate 139 again. Thus, it can be seen that the net result of this sequence of operations is a 50-ms. enabling pulse on line 123 followed 30 ms. later by a 50-ms. enabling pulse on line 124. These two 50-ms. pulses are the pulses the successively enable the two bank of gates 115-118 and 119-122 to produce a pair of closely spaced pulses on a selected pair of the output lines R1-R4.

While the two pulses are being produced on lines R1-R4, a corresponding pair of pulses is also produced on the line C4 leading to the "4th column" input to the DTMF signal generator 22. These latter pulses are produced by the inputs to an AND gate 140, one of which is the 130-ms. pulse from gate 136a, and the other of which is the $\overline{Q}2$ output from the multivibrator 137. It will be recalled that this $\overline{Q}2$ output remains high for the first 50 ms. of the 130-ms. pulse, then goes low for 30 ms. before returning to its normal high level. Thus, only the first and last 50-ms. fractions of the 130-ms. pulse from gate 136a are passed through the gate 140 to produce two 50-ms. pulses (spaced by 30 ms.) on the line C4.

Returning to the AND gate 108 that passes the off-hook pulse as a query input for the code generator 61, it will be recalled that the gate 108 is enabled by "not busy" signal at its other input. If the system is already busy when that station goes off-hook, the AND gate 108 receives a "busy" signal and is disabled so that the query code is never generated.

In this busy condition, the off-hook pulse is also utilized to immediately initiate the generation of a busy tone at the calling station, before the calling party ever receives a dial tone. Thus, the off-hook pulse from the output Q1 of multivibrator 104 is passed through the AND gate 106 and an OR gate 141 to set a "busy tone" flip flop 142, thereby producing a d-c. signal at the output Q of the flip flop 142 to activate the audible signal generator 21 to produce a busy tone and to disable a monostable multivibrator 143 and a NOR gate 168 leading to the set input of a reorder tone flip flop 169. The gate 106 is enabled by the output of an AND gate 144 which passes the same "busy" signal that disables the gate 108. Gate 144 is enabled by a signal indicating that this station is not a called station (the source of this signal will be described below) so that the "busy" signal is passed through the gate 144 only at a calling station. The "busy" signal is also generated at called stations, as will be described below, but the busy tone is not generated in the "called" mode.

In addition to being supplied to the three AND gates 106, 107 and 108, the off-hook pulse from the multivibrator 104 is supplied to the input S1 of the dual monostable multivibrator 143 to produce a slightly delayed off-hook pulse which performs several functions. The purpose of the delay is to allow time for initiation of a busy tone within the query period in the event that a query signal is received from another station. The basic functions performed by the "delayed off-hook" pulse are:
1. Initiation of dial tone.
2. Initiation of a "system control" signal which allows the transponder to respond to a number of possible calling mode events.
3. Connection of the calling party to the transmit line to allow address digits to be dialed out.
4. Connection of the DTMF receiver to the transmit line rather than the receive line to monitor the dialing out of DTMF address digits.
5. Initiation of a timing cycle which will automatically reset the transponder if a valid sequence of address digits are not dialed out within prescribed time intervals.

The "delayed off-hook" pulse is produced at the output Q1 of the multivibrator 143 in response to the negative-going edge of the off-hook pulse applied to the input S1 of the multivibrator 143. Thus, the output pulse at Q1 is delayed by an interval corresponding to the width of the input pulse. If the transponder receives a query signal from another station within that interval, the incoming query signal is detected by the DTMF receiver 23 and results in the transmission of an "any digit" signal from the DTMF receiver to the code detector 68. The code detector 68 in turn produces a pulse that resets the multivibrator 143 and momentarily busies the entire transponder.

More particularly, the positive-going edge of an "any digit" signal on line 54 from the DTMF receiver 23 triggers the input S2 of a dual monostable multivibrator 145 to produce a "momentary busy" pulse at output Q2. This pulse, which typically has a width of six seconds, is passed through an OR gate 146 to a NOR gate 147 to apply a negative signal to the input R1 of the multivibrator 143 and thereby disable the input S1 to block the generation of a pulse at output Q1. The significance of blocking this "delayed off-hook" output pulse will be apparent from the ensuing description. In addition to disabling the input S1 of the multivibrator 132, the "momentary busy" pulse disables the AND gate 108 via inverter 110; enables the AND gate 144; and illuminates a "busy" lamp by turning on a transistor TR1 via OR gate 101 and inverter 102. As already described above, a high output from the gate 144 at a non-called station enables the gate 106 to permit an off-hook pulse to set the "busy tone" flip flop 142. The resulting steady d-c. voltage at the output Q of the flip flop 142 activates the audible signal generator 21 to produce a busy tone, and also supplies a steady disabling signal to the input R1 of the multivibrator 143 (continuing to block a "delayed off-hook" pulse until the "busy tone" flip flop 142 is reset) and to the NOR gate 168 leading to the set input of the reorder tone flip flop 169.

If the transponder does not receive a query signal from another station within the query period, the "delayed off-hook" pulse is produced at the output Q1 of the multivibrator 143 in response to an off-hook condition, to effect the various functions outlined above.

To initiate the dial tone, the "delayed off-hook" pulse from the output Q1 of multivibrator 143 sets a "dial tone" flip flop 150 to produce a d-c. voltage at the output Q; this d-c. voltage is supplied to the "dial tone" input of the audible signal generator 21 to generate a dial tone for the calling station. It will be recalled that the audible signal generator 21 is connected to the drop side of the receive line by the relay 24 in its normal or de-energized state. As already mentioned, a dial tone cannot be generated at more than one station in the system at any given time.

The "delayed off-hook" pulse also sets a "system control" flip flop 151 to produce a steady d-c. "system control" signal at its output Q. This signal in effect indicates that the station associated with this particular transponder is in control, and accordingly enables a number of AND gates for subsequent functions. More particularly, the "system control" signal enables AND gates 152, 153 (via OR gate 154), 155 and 156 (via OR gate 157), 158 and 159, and disables AND gate 160 via inverter 161. These gates will all be described in more detail below.

In order to cut through the transmit line of the calling station to permit DTMF address signals to be dialed out by the calling party, while at the same time connecting the DTMF receiver 23 to the transmit line to monitor the DTMF signals being dialed out, the delayed off-hook pulse sets a "transmit/monitor" flip flop 162. This produces a d-c. voltage at the output Q of flip flop 162 to render transistors TR4 and TR5 conductive, via inverters 163 and 164, and thereby energize the relays 25 and 26. As explained previously, the energization of relay 25 cuts through the transmit line to the subscriber handset while disconnecting the DTMF signal generator 22 from the transmit line, and the energization of relay 26 connects the DTMF receiver 23 to the transmit line and disconnects it from the receive line.

To initiate a timing cycle which will automatically reset the transponder if a valid sequence of address digits is not dialed out within prescribed time intervals, the "delayed off-hook" pulse triggers a dual monostable multivibrator 165, via OR gate 166 and input S1. This dual multivibrator 165 is enabled by a positive signal applied to its input R1-2 from a NOR gate 174, which receives a steady high output signal from a "receive relay" flip flop 175. The output Q1 of this multivibrator 165 is connected to its input S2 which responds to the negative-going edge of the pulse at Q1, so that the output pulse at Q2 is produced only after a prescribed delay interval, e.g. five seconds, following the leading edge of the input pulse at S1. As will be described in more detail below, if the first DTMF address digit is dialed out within this 5-second interval, the timing cycle is re-triggered by another pulse (any digit) at the input S1 of the dual multivibrator 165. However, if the first address digit is not dialed out within this 5-second interval, the multivibrator 165 produces a "time-out" pulse at output Q2 to initiate the generation of a reorder tone, to reset the rest of the transponder, and to send a "system clear" signal to all other stations.

More specifically, the "time-out" pulse is transmitted through the AND gate 152 (enabled by the "system control" signal), inverter 167 and NOR gate 168 (enabled by the steady low output of flip flop 142) to the set input of a "reorder tone" flip flop 169. This produces a d-c. voltage at the output Q of the flip flop 169 which is supplied to the "reorder" input of the audible signal generator 21 to produce a reorder tone at the calling station. To reset the rest of the transponder, the output from the AND gate 152 is also: (1) transmitted through an OR gate 170 to the reset input of the "dial tone" flip flop 150, to terminate the d-c. output signal from this flip flop and thereby terminate the dial tone being generated by the audible signal generator 21; (2) passed through OR gate 171 to the reset input of the "transmit/monitor" relay flip flop 162 to terminate the output voltage from this flip flop and thereby de-energize the relays 25 and 26; and (3) passed through OR gates 172 and 173 to the input S2 of the monostable multivibrator 143 to trigger the generation of an output pulse at the output Q2 in response to the negative-going edge of the time-out pulse. This latter output pulse resets the "system control" flip flop 151, a "ringback tone" flip flop 176 (via OR gates 177, 178, and 179), the "busy latch" flip flop 109, a "called" flip flop 180 (via OR gate 177), a "radio answer" flip flop 181 (via OR gate 177), the "receive relay" flip flop 175 (via OR gate 177), and "ring" flip flops 182 and 182a (via OR gates 177 and 183). With the exception of the "system control" flip flop 151, all these flip flops remain to be discussed below, but the point to be recognized here is that virtually the entire transponder (with the exception of the "reorder tone" flip flop 169) is reset by the time-out pulse. The calling party will then continue to receive the reorder tone, and the transponder will continue to generate a "busy" code signal if this station is called by another party until the station is returned to an on-hook condition.

For the purpose of clearing all other stations in the system, the time-out pulse from the AND gate 152 and OR gate 172 is also supplied to the input line 126 to the code generator 61. Within the code generator 61, this signal passes through OR gates 132 and 135 to AND gates 115 and 121, producing successive pulses on output lines R1 and R3. Of course, pulses are simultaneously produced on output line C4, so that the total output of the code generator 61 supplies pulses to the R1,C4 and R3,C4 inputs to the DTMF signal generator 22. The generator then produces corresponding DTMF outputs which comprise the "system clear" signal. The effect of this "system clear" signal at a station receiving the same is to trigger the input S2 of the multivibrator 143 through OR gate 173 to produce a positive pulse at the output Q2, which resets the "ringback tone" flip flop 176, the "called" flip flop 180, the "radio answer" flip flop 181, the "receive" flip flop 175, the "ring" flip flops 182 and 182a, and the "busy latch" flip flop 109. Concurrently with the positive pulse at the output Q2, the multivibrator 143 produces a negative pulse at the output $\overline{Q2}$. This negative pulse is applied to the input R2 of the multivibrator 145 to disable the output Q2 thereof, so that the "any digit" signals produced by the "system clear" signal do not busy the receiving transponder.

To recapitulate the status of the transponder at the commencement of the timing cycle, the calling party hears a dial tone and has five seconds to dial out the first address digit; the DTMF signal generator is isolated from the transmit line of the calling station so that it cannot interfere with the DTMF digits being dialed out by the calling party; the DTMF receiver is connected to the transmit line so that it can monitor the address digits that are dialed out; and the transponder is receiving a "system control" signal. The next event to occur in the course of a normal call—and which must occur to prevent the generation of a time-out pulse—is the dialing of a valid sequence of address digits within the prescribed time limits.

Each time an address digit is dialed out, the DTMF receiver 23 detects and encodes that digit, producing both a binary code signal representing the dialed digit and an "any digit" signal. The binary coded signal from the DTMF receiver 23 is utilized only when the transponder is associated with a called station, i.e., when a given sequence of the binary coded signals is decoded as the address of that station. The "any digit" signal, however, is utilized at the calling station to terminate the dial tone; to re-initiate the timing cycle each time an address digit is dialed out; and to ensure that only the proper number of address digits are transmitted from the calling station.

To terminate the dial tone when the first address digit is dialed, an "any digit" signal from the DTMF receiver 23 is passed through an OR gate 170 to the reset input of the "dial tone" flip flop 150, thereby terminating the d-c. signal that sustains the generation of a dial tone by the audible signal generator 21. In order to re-initiate the timing cycle each time an address digit is dialed out, the "any digit" signal is passed through the OR gate 166 to retrigger the timing multivibrator 165. It will be recalled that the timing cycle measures an interval of five seconds, so the calling party is allowed a maximum of five seconds between the dialing of successive digits. If more than five seconds elapse between the dialing of two successive digits, the multivibrator 165 "times out", producing a time-out pulse at the output Q2 which performs all the functions already described above.

The other function of an "any digit" signal in the calling mode is to permit the address digits to be counted as they are dialed out, so that the calling party's handset can be disconnected from the transmit line when the prescribed number of digits for a valid address have been dialed out. This prevents an excessive number of digits from being dialed out. The illustrative system is designed to permit the user to set the transponder for use with either a 3-digit or 4-digit address system. Thus, a switch SW1 is provided with two different positions for enabling either one, but not both, of a pair of AND gates 184 and 185 leading to an AND gate 186. When the switch SW1 is open, the AND gate 184 is enabled; when the switch SW1 is closed, the gate 185 is enabled via inverter 187. As will be apparent from the ensuing description, enabling the AND gate 184 conditions the system to function in a 4-digit address mode, whereas enabling the gate 185 conditions the system to function in a 3-digit address mode.

Each time a valid DTMF signal is detected by the DTMF receiver 23 on the transmit line of the calling station, the clock signal generated by the receiver 23 is passed through an inverter 188 and applied to a digit counter 189. This counter 189 produces sequential output pulses, in response to successive clock input pulses, on output lines DG1, DG2, DG3 and DG4. The third and fourth output lines, representing the third and fourth clock pulses, are connected to the AND gates 185 and 184, respectively. Consequently, if the gate 185 is enabled by the switch SW1, only the "3rd digit" output pulse from line DG3 is transmitted to the gate 186, through gate 185 and an OR gate 190. On the other hand, if the gate 184 is enabled by the switch SW1, only the "4th digit" pulse from line DG4 is transmitted to the gate 186, through gate 184 and OR gate 190.

The other input to the AND gate 186 is the "any digit" pulse from the DTMF receiver 23. Thus, whichever pulse is transmitted by the gates 184 and 185, i.e., either the "3rd digit" pulse or the "4th digit" pulse, it is passed through the AND gate 186 only when it coincides with an "any digit" pulse, thereby indicating that a valid third or fourth DTMF digit has been dialed out. This output pulse from the AND gate 186 is applied to the input S1 of a dual monostable multivibrator 191 which is triggered by the negative-going edge of the pulse at S1 to produce a pulse at the output Q1. From Q1, the output pulse is passed through OR gates 192 and 193 to reset the digit counter 189, because the selected number of digits for a valid address has been reached.

In order to disconnect the calling party's handset from the transmit line when the prescribed number of digits for a valid address have been dialed out, the pulse from output Q1 of multivibrator 191 is transmitted through the OR gate 171 to reset the "transmit/monitor relay" flip flop 162 and thereby de-energize the relays 25 and 26. The de-energization of relay 25 re-connects the DTMF signal generator 22 to the transmit line and disconnects the transmit line from the subscriber handset so that no further digits can be dialed out. De-energization of relay 26 switches the DTMF receiver from the transmit line to the receive line of the calling station, so that the DTMF receiver resumes the monitoring of incoming DTMF signals.

Assuming that the precribed number of valid address digits have been dialed out within the allotted time period, the calling station transponder at this point awaits receipt of a DTMF code signal from the called station. As mentioned previously, the DTMF receiver is now connected to the receive line, listening for a return code signal from the called station. These return code signals may be any of the following, or a sequence of the following:

1. a "busy" signal representing a busy condition at the called station,
2. a "ringback" signal representing a ringing condition at the called station,
3. an "answer" signal indicating that the called station has answered,
4. a "push-to-talk" or "not push-to-talk" signal in a two-way radio communication system,
5. a "radio answer" signal indicating that the called station is a radiotelephone station that has answered,
6. a "system clear" signal indicating that the entire system should be cleared.

As explained above in connection with the code generator, the codes for these signals are different pairs of the four DTMF signals available from the fourth column (1633 Hz) in the conventional DTMF matrix. More specifically, this fourth-column frequency can be combined with any of the four "row" frequencies, in the DTMF matrix, namely, 698 Hz (R1), 770 Hz (R2), 852 Hz (R3) or 941 Hz (R4). The different pairs of these four DTMF signals which represent the codes for the signals listed above are as follows:

R1,C4+R3,C4=system clear
R2,C4+R4,C4=busy
R2,C4+R1,C4=ringback
R2,C4+R3,C4=answer
R2,C4+R4,C4=push-to-talk
R3,C4+R1,C4=not push-to-talk
R3,C4+R2,C4=radio answer The presence or absence of these seven different pairs of DTMF signals in the four outputs from the DTMF receiver 23 is detected by seven AND gates 194 through 200 in the code detector 68. Each of these seven AND gates has two inputs connected to a selected pair of the four output lines from the DTMF receiver 23 representing the four "4th column" DTMF signals R1,C4; R2,C4; R3,C4; and R4,C4. At least one of the inputs to each AND gate is a pulse supplied via a monostable multivibrator 201 or 145 so that the output of each AND gate is always in the form of a pulse rather than a sustained d-c. voltage.

Before discussing the effect of the various code signals that can be detected by the seven AND gates 194–200, it should be noted that merely dialing out the proper number of address digits within the prescribed time does not disable the timing multivibrator 165. The time-out feature is still desired in this situation because the calling party may dial out the proper number of digits but for a non-existent address in the system. In this case, no response whatever will be received by the calling station after the address is dialed out, and so the multivibrator 165 will time out, and the resulting time-out pulse at the output Q2 will initiate a reorder tone and clear the rest of the system as described above.

Returning now to the AND gates 194–200 if the called station is already off-hook when its address is dialed out, a "busy" code (R1, C4+R4, C4) is received at the calling station and detected by the AND gate 195. The resulting output pulse from this particular gate is passed through the AND gate 155 (enabled by the "system control" signal) and OR gate 141 to set the "busy tone" flip flop 142. This produces a d-c. voltage at the Q output of the flip flop 142 for the purpose of initiating the generation of a busy tone from the audible signal generator 21 associated with the calling station. Consequently, the calling party hears a busy tone and is thus informed that the calling station is busy. The output from the flip flop 142 also disables the "delayed offhook" Q1 output of the multivibrator 143 (via NOR gate 147 and input R1) and the NOR gate 168 leading to the set input of the "reorder tone" flip flop 169. The calling party must thus hang up and start through the initial off-hook sequence again to place another call.

If the signal received from the called station is a "ringback" code (R2, C4+R1, C4), it is detected by the AND gate 196. The resulting output pulse from the gate 196 is passed through the NOR gate 174 to reset the timing multivibrator 165 and thereby prevent the generation of a "time-out" pulse from this multivibrator. The ringback pulse is also passed through the AND gate 156 (enabled by the "system control" signal) and OR gate 202 to set the "ringback tone" flip flop 176, thereby producing a d-c. voltage at the Q output of flip flop 176 to produce a ringback tone from the audible signal generator 21 associated with the calling station. To latch the busy status of the transponder at the calling station in response to a ringing condition at the called station, the pulse from gate 196 also sets the "busy latch" flip flop 109 via OR gate 205. The resulting d-c. output from the flip flop 109 not only preserves all the conditions produced by the momentary busy signal from the Q2 output of multivibrator 145, but also enables a "local override" monostable multivibrator 203 and its input gate 204 to permit a response to a "local override" command, which will be discussed in more detail below.

If the called party answers, an "answer" code (R2, C4+R3, C4) signal is received at the calling station and produces an output pulse from the gate 197. This pulse is passed through OR gates 206, 207 and 179 to reset the "ringback tone" flip flop 176, thereby terminating the ringback tone that was generated by the audible signal generator 21 in response to the "ringback" code signal. The "answer" pulse is also passed through an OR gate 208, the AND gate 158 (enabled by the "system control" signal), and an OR gate 209 to set the "receive relay" flip flop 175. As will be explained in the ensuing description, the setting of the flip flop 175 cuts through both the receive and transmit lines at the calling station by energizing the relays 24 and 25, and also conditions the transponder for operation in a conference mode, a "push-to-talk" mode, or an "all call" or "group call" mode in the event that one or more of those options are elected.

Energization of the receive and transmit relays 24 and 25 is effected by the d-c. voltage at the output Q of the flip flop 175 via OR gate 210 and an AND gate 211 which is normally enabled by a steady "high" signal from the output $\overline{Q1}$ of a dual monostable multivibrator 212. The output from the gate 211 turns on a transistor TR3 via inverter 213, thereby energizing the receive relay 24, and also passes through AND gates 237 and 238, OR gate 239 and inverter 163 to turn on the transmit relay transistor TR4. Gate 237 is normally enabled by a steady "high" d-c. voltage from the output $\overline{Q1}$ of multivibrator 203, and gate 238 is normally enabled by a steady "high" d-c. voltage from a normally closed push-to-talk switch SW2. Relay 26 remains de-energized so that the DTMF receiver 23 continues to monitor the receive line to detect any special signals such as "local override", "system override", "push-to-talk" etc.

To condition the transponder for the other operating modes mentioned above, the d-c. output from the flip flop 175 also (1) disables the digit counter 189 so that it does not count any clock pulses received from the DTMF receiver 23 after the receive line is cut through to the calling station, (2) enables an AND gate 214 to permit the passage of a "push-to-talk" pulse (to be described below), (3) disables the timing multivibrator 165 via NOR gate 174 to prevent the generation of a time-out signal while the received path is cut through to the calling station, (4) enables the AND gates 155 and 156 (via OR gate 157) to permit the passage of "busy" and "ringback" pulses to the set inputs of the "busy tone" and "ringback tone" flip flops 142 and 176, respectively, while the receive line is cut through to the calling station, (5) enables an AND gate 215 to permit the passing of a "radio answer" signal therethrough, and (6) enables the dual multivibrator 212 for response to possible subsequent command signals for optional operating modes such as conference calls, "all call" and "group call."

When the called station goes on-hook after answering, no change occurs in the transponder at the calling station. When the calling station goes on-hook, however, the monostable multivibrator 104 is triggered to produce a pulse at the output Q2. This "on-hook" pulse is passed through the AND gate 153 (enabled by the "system control" signal) and on through the OR gate 172 to effect all the same functions effected by a "time-out" signal applied to gate 172, which have already been described above. In addition, the on-hook pulse is passed through OR gate 177 to reset the "ringback tone" flip flop 176 (via OR gates 178 and 179), the "called" flip flop 180, and the "radio answer" flip flop 181. Finally, the on-hook pulse also resets both the "busy tone" flip flop 142, (via OR gate 216) and the "reorder tone" flip flop 169. The transponder is thus reset to its original condition, ready to respond to either another off-hook condition at the station associated with the transponder, or to the detection of a decoded address corresponding to that station.

After a called station has answered, either the calling or called station may dial an additional station or stations to establish a conference call. Thus, if one of the parties already on the line dials a third station, the stations already on the line will receive a "busy" or "ringback" code signal, either of which will be passed through the OR gates 217 and 218 to the input S1 of the multivibrator 212. This produces a negative pulse at the output Q1 of the multivibrator 212, and this negative pulse disables the AND gate 211 so as to de-energize the receive relay 24 for a brief time corresponding to the width of the negative pulse. A typical width for this negative pulse is two seconds, which means the relay 24 is de-energized for two seconds, and then energized again.

The purpose of de-energizing the receive relay 24 for this brief interval is to permit the calling station to receive a brief busy or ringback tone from the audible signal generator 21 via the receive line. However, the audible signal generator 21 is connected to the receive line only for the brief, e.g. two-second, interval corresponding to the width of the negative pulse from the output $\overline{Q}$ of the multivibrator 212.

During the brief interval that the audible signal generator 21 is connected to the receive line, the generator 21 is activated to produce either a busy tone or a ringback tone in the same manner described previously in connection with the first called station. That is, the "busy" or "ringback" code signal from gate 195 or 196 sets the corresponding flip flop 142 or 176 to produce the requisite d-c. input for the audible signal generator. Thus, the calling party hears a brief burst of busy or ringback tone to let the calling party know the status of the second called station, but the line of communication between the original called station and the calling station is interrupted for only this brief interval.

In the event that the newly called station answers, the resulting "answer" pulse from OR gate 206 is applied to the input S2 of the multivibrator 212, which responds to the positive-going edge of the "answer" pulse and produces a reset pulse at the output Q2. This pulse is transmitted through gates 216 and 178 to the reset inputs of the "busy tone" and "ringback" flip flops 142 and 176, respectively.

The "Called" Mode

Turning next to the operation of the transponder in a "called" mode, the station decoder 53 (FIG. 4) determines whether any given combination of DTMF signals or "digits" detected by the DTMF receiver 23 corresponds to the address of that particular station. As described previously, the DTMF receiver 23 generates a binary output representing each detected DTMF signal. This binary output is produced on the four lines A, B, C and D, which are used as the four inputs to a binary-to-decimal converter 219 which converts the binary input to a 1-of-10 decimal output. That is, the ten output lines from the converter 219 represent the ten available DTMF address digits, 0 through 9, and the converter 219 produces an output pulse on the line corresponding to the particular digit represented by the binary input.

The ten output lines from the converter 219 are connected to an 8 × 10 matrix switch 220 having two banks of four manually operable switches (not shown) which can be set to pass only selected digits represented by the ten input lines. For example, the matrix switch 220 might be set to pass only the digits 5893 to the first four output lines AD1-AD4, and only the digits 2786 to the second four output lines AD5-AD8. In the illustrative system, the first four output lines AD1-AD4 from the switch 220 represent the station address, i.e., the station at which the switch 220 is located will respond only if signals appear on all four of those lines AD1-AD4 and in the proper sequence AD1, then AD2, then AD3, then AD4. This sequence of output signals can, of course, be produced only when the proper sequence of DTMF digits, e.g. 5893, has been dialed.

To determine whether a signal on any given one of the four lines AD1-AD4 is appearing in the proper sequence, these four lines are connected to four separate AND gates 221-224 which are sequentially enabled by the four outputs of the digit counter 189. It will be recalled that this counter 189 counts clock pulses from the DTMF receiver 23, producing successive output pulse on four output lines DG1-DG4 in response to each of the first four clock pulses. Thus a pulse on line DG1 indicates that the concurrent BCD output from the DTMF receiver 23, and hence the concurrent output from the matrix switch 220, represents the first digit; a pulse on line DG2 indicates that the concurrent output from switch 220 represents the second digit; and so on. Consequently, the four AND gates 221-224 will produce outputs only when (1) the matrix switch 220 detects one of the selected address digits and (2) the digit counter 189 indicates that the detected digit appears in the proper position in the selected sequence of address digits.

The outputs of all four AND gates 221-224 are passed through a common NOR gate 225 and then on to a NOR gate 226 leading to a counter 227. The other input to the NOR gate 226 is the clock pulse output from the DTMF receiver 23. Thus, the NOR gate 226 produces an output pulse only when the output from one of the AND gates 221-224 coincides with a clock pulse from the DTMF receiver 23, thereby providing a safeguard against spurious output signals from the gates 221-224.

The counter 227 counts successive output pulses from the AND gates 221-224 and produces output pulses on lines 228 and 229 in response to the third and fourth pulses, respectively. This permits either the third or fourth pulse to be selected as the last address digit, depending upon whether a 3-digit or 4-digit address system has been selected by the setting of the switch SW1. If a 3-digit system is selected, a steady enabling signal is supplied to a NOR gate 230 in the output line 228, so that the "3rd-digit" output from the counter 227 is passed through the gate 230 to set a "ring" flip flop 182. If a 4-digit address system is selected, the NOR gate 230 is disabled, and the flip flop 182 is set by the "4th digit" output from the counter 227.

Whenever the flip flop 182 is set, whether by the 3rd or 4th digit, the resulting d-c. signal at the Q output enables an AND gate 232 to pass a conventional "2 on, 4 off" ring signal from gate 160 to the base of a transistor TR6. As will be understood by those familiar with the telephone art, this conventional ring signal turns the transistor TR6 repetitively on and off to supply the standard ringing voltage pattern to the E lead for the ringing circuit at the called station. The gate 160 is always enabled in the absence of a "system control" signal from the flip flop 151.

In addition to activating the ring circuit, the output of the flip flop 182 sends a "called" signal to the rest of the transponder system to condition the system for operation in the called mode. Thus, the output $\overline{Q}$ of the flip flop 182 is connected to a NAND gate 233 so that this output $\overline{Q}$ produces a positive "called" output from gate 233 whenever a valid address is recognized. This "clled" output enables the second half of the dual monostable multivibrator 191 at input R2 so that the negative-going edge of the pulse produced simultaneously at the output Q1 and input S2 of multivibrator 191 triggers the production of a positive pulse at a second output Q2 and a corresponding negative pulse at output $\overline{Q2}$. These latter pulses are simply delayed "called" pulses.

Before following the "called" pulse from the multivibrator 191, it should be noted that the station address decoder 53 has a second channel for receiving the output signals from the other four output lines AD5-AD8 of the matrix switch 220. The manually operable switches associated with these four lines may be set to pass a sequence of digits for a second address at the same station, such as a second station address, an "all call" address, a "group call" address, or the like. In any event, the second channel functions in exactly the same manner as the first channel, and the components of the second channel have been identified by the same reference numerals used for corresponding components in the first channel, but with the addition of the distinguishing suffix "a".

Returning now to the "called" pulses, the negative pulse from output $\overline{Q2}$ of multivibrator 191 is passed through a NOR gate 235, which is always enabled unless an "all call" mode has been selected, (to be discussed below), and enables a pair of AND gates 103 and 236. The other input to gate 103 is enabled if the local station is off-hook, and the other input to gate 236 is enabled if the local station is on-hook. Thus, depending upon whether the called station is off-hook or on-hook, one of these two gates 103 or 236 will pass the "called" pulse. If it is gate 103 that is enabled (off-hook), the pulse is gated to line 130 which causes the code generator 61 to send a "busy" code to the DTMF signal generator 22 so that the calling party receives a busy tone. If it is gate 236 that is enabled (on-hook), the pulse is gated to line 131 which causes the code generator 61 to send a "ringback" code to the DTMF signal generator 22 to produce a ringback tone at the calling station. Receipt of the ringback signal at the calling station and all other stations also latches their busy status circuits, via their "busy latch" flip flops 109, until a "system clear" signal is received.

The positive "called" pulse from output Q2 of multivibrator 191 performs the following functions:
(1) enables AND gate 234 for use in an "all code" mode,
(2) sets the "busy latch" flip flop 109 to "busy" the transponder in the same manner described above for the calling mode,
(3) sets the "ringback tone" flip flop 176 via OR gate 202 to activate a timer that generates the "2 on, 4 off" ring signal,
(4) sets a "called" flip flop 180 to produce a steady d-c signal at its Q output.

The d-c signal from the flip flop 180 disables the AND gate 144 to prevent the generation of a busy tone in response to an off-hook pulse when the called station answers, and enables the AND gate 107 to supply the off-hook pulse to the "answer" input line 127 to the code generator 61. The output of the gate 107 is also passed through the OR gate 207 and 179 to reset the "ringback tone" flip flop 176 and thereby deactivate the timer for the "2 on, 4 off" ring signal.

Assuming the called party answers, the resulting off-hook pulse causes relays 24 and 25 to be energized at the called station to cut through both the transmit and receive lines for the called station. Relay 26 remains de-energized so that the DTMF receiver 23 continues to monitor the receive line to detect any special signals such as "local override", "system override", "push-to-talk" etc. Relays 24 and 25 are both energized by the off-hook pulse setting the "receive relay" flip flop 175 via AND gate 107 (enabled by the "called" pulse) and OR gate 209. The resulting d-c signal at the output Q of flip flop 175 passes through gates 210 and 211 to the base of the transistor TR3, and from gate 211 the same signal passes through gates 237, 238 and 239 to the transmit relay transistor TR4. Gates 237 and 238 are enabled in the same manner described above for the calling mode.

When the called station hangs up, the resulting "on-hook" pulse resets the transponder at the called station, except the "busy latch" flip flop 109, and does not send any signal to the calling station. The "on-hook" pulse produced by the multivibrator 104 passes through the OR gate 177 to the reset inputs of the "called", "radio answer" and "receive relay" flip flops 180, 181 and 175, respectively. This same pulse is also passed through the OR gate 183 to reset the flip flops 182 and 182a (if not already reset by an "answer" pulse). Other than another transponder exercising his system override capability (explained above), the only terminal capable of "clearing" the system through transmission of a system clear code is the calling station through gates 172 and 153.

When the output of either of the NOR gates 225 and 225a goes low, indicating the presence of a valid digit for one of the addresses, the output of a NAND gate 250 goes high to supply a disabling positive-going pulse to a NOR gate 251. In the absence of this disabling pulse, an "any digit" signal from line 54 is passed through an inverter 252 and on through the NOR gate 251 to an AND gate 253. The other input to the AND gate 243 is the output of the transmit-monitor relay flip flop 162, so this input of the gate 253 is enabled whenever the relay 26 is energized, i.e., whenever the DTMF receiver 23 is monitoring DTMF signals being dialed out on the transmit line. When the AND gate 253 is so enabled "any digit" signal from the NOR gate 251 passes on through the gate 253 and the OR gate 193 to the reset input of the counter 189. This resetting function is desired because the appearance of an "any digit" signal in the absence of a "valid digit" signal from one of the gates 225 or 225a, as detected by the gate 251, indicates the presence of an invalid digit. For this reason, the output of the gate 253 can be referred to as an "invalid digit" signal.

The "Push-To-Talk" Mode

As explained previously, if the called station is a radio site, it returns a "radio answer" code signal (R3, C4+R2, C4) rather than a "busy" or "ringback" code signal. This "radio answer" code signal is detected by the AND gate 200, and the output pulse from this gate is passed through the OR gate 206 to effect all the same functions described above for the "answer" pulse from the gate 197. In addition, however, the "radio answer" pulse triggers a brief burst of ringback tone at the calling station to indicate that a radio station has been called, and conditions the transponder at the calling station for operation in the push-to-talk mode. Thus, the "radio answer" pulse from gate 200 is applied to the set input of the "radio answer" flip flop 181 to produce a d-c. voltage at the output Q and thereby enable a monostable multivibrator 240 via AND gate 215 (already enabled by the "reactive relay" flip flop 175). As will be apparent from the ensuing description, this multivibrator 240 generates the input pulses that cause the code generator 61 to produce the "push-to-talk" (PTT) and "not push-to-talk" ($\overline{PTT}$) code signals.

To operate in the PTT mode, it is necessary to open the switch SW2 so that the continuous enabling signal is removed from the AND gate 238. With this switch SW2 open, the gate 238 is enabled only when the handset pushbutton 241 is depressed, which has the same effect as closing the switch SW2 but only as long as the pushbutton 241 remains depressed. This places the transmit relay 25 at the calling station under control of the handset pushbutton 241 with the code signals PTT and $\overline{PTT}$ being generated automatically each time the relay 25 is energized (PTT) or de-energized ($\overline{PTT}$). Each time the pushbutton 241 is depressed, it supplies a positive voltage to the gate 238 and thus to the input S1 of the multivibrator 240 and to the OR gate 239. The S1 input responds to the positive-going edge of the input signal to trigger a pulse at output Q1 of the multivibrator 240. This output Q1 is tied to the "PTT" input line 128 to the code generator 61, thereby producing a PTT code signal from the code generator. At the same time, the signal applied to the OR gate 239 passes through the inverter 163 to turn on the transistor TR4 and energize the transmit relay 25 so that the transmit line at that station is cut through.

When the handset pushbutton 241 is released, the gate 238 is disabled and the resulting drop in voltage at the input S2 of the multivibrator 240 triggers a pulse at the output Q2. This output Q2 is tied to the "PTT" input line 129 to the code generator 61, thereby producing a $\overline{PTT}$ code signal from the code generator. At the same time, the negative output from the gate 238 turns off the transistor TR4 and de-energizes the transmit relay 25.

The receipt of a PTT code signal produces an output pulse from gate 198, and this pulse is passed through the gate 214 previously enabled by the output from the "receive relay" flip flop 175. The resulting output pulse from gate 214 sets a "PTT" flip flop 242 to produce a d-c. voltage that passes through an inverter 243 to turn on a transistor TR2 and illuminate a PTT lamp. This is a signal to the party at that station that the radio transmitter is keyed and that he may now transmit over that radio. When a $\overline{PTT}$ code signal is received, the gate 199 produces a pulse that resets the flip flop 242 and extinguishes the PTT lamp. This is a signal to the party that the transmitter is not keyed. Transmissions between the two stations proceed in this manner until the calling station hangs up, which generates a "system clear" code signal in the same manner described previously for the termination of a call to a non-radio station.

The "All Call" Mode

In the "all call" mode, the calling party dials a special address which is valid for every station in the system, including the calling station. In the illustrative system, this "all call" mode is selected by closing a switch SW3. This connects the output Q of the flip flop 182a to the normally enabled input of the NOR gate 235 and to the AND gate 234 that receives the positive "called" pulse from output Q2 of multivibrator 191. This connection causes a positive d-c. signal at output Q of the flip flop 182a to (1) disable the gate 235 and thereby prevent the generation of a busy or ringback code signal, and (2) enable the gate 234 to pass the "called" pulse to the AND gate 159.

Since the "all call" address is valid for every station in the system, it produces a "called" pulse from the output Q2 of multivibrator 191 at every station, including the calling station. This "called" pulse can pass through the gate 234 at every station, but it can pass through the AND gate 159 only at the calling station because this is the only station that produces a "system control" signal to enable the gate 159. From gate 159, the pulse passes through gates 208, 158 (also enabled by the "system control" signal) and 209 to set the "receive relay" flip flop 175 and thereby cut through the receive and transmit lines by energizing the relays 24 and 25. Thus, a calling station that dials out an "all call" address has its receive and transmit lines cut through as soon as the address is dialed out, rather than awaiting receipt of an "answer" signal.

The negative-going edge of the pulse from gate 159 also triggers the S1 input of the multivibrator 212 to produce a negative pulse at the output $\overline{Q1}$. This negative pulse de-energizes the relay 24 for a brief interval, in the same manner described previously, just long enough for the calling station to receive a brief burst of ringback tone from the audible signal generator 21 enabled through gates 202 from Q2 of the multivibrator 191.

Otherwise, the operation of the transponders in the "all call" mode, at both the calling and called stations, is the same as described previously for a normal calling or called mode.

It will be appreciated that the illustrative system can also provide a "group call" mode, in substantially the same manner just described for the "all call" mode. The only difference would be that the address dialed in "group call" mode would be valid for only a certain group of stations, as determined by the setting of the switches associated with the four lines AD5–AD8 in the matrix switch 220.

The Override Modes

When a subscriber comes off-hook into a busy system, he may exercise a "local override" option by depressing an "LOR" pushbutton 245 on his handset. This will connect both the transmit and receive lines of his station into the system so that he can participate in any communications already in progress throughout the system, without otherwise affecting any of the stations that are already communicating with each other.

Depressing the local override pushbutton 245 enables the AND gate 204, whose other input is already enabled by the steady d-c. output from the "busy latch" flip flop 109 due to the busy condition of the system. The resulting output from the AND gate 204 is passed through the OR gate 210 and AND gate 211 (enabled by the normal steady "high" $\overline{Q1}$ output from the multivibrator 212) to energize both the receive relay 24 and the transmit relay 25 in the same manner described above for the output from the "receive relay" flip flop 175 (which is also supplied to the OR gate 210). This gives the overriding party access to all the stations already on the line, and cuts off the busy tone from the overriding station.

To provide a signal to all stations already on the line that there is a station exercising the local override option, thereby gaining access to their communications, the output of the AND gate 204 is also passed through an AND gate 246 to trigger the dual monostable multivibrator 203 which is already enabled by the steady d-c. output from the "busy latch" flip flop 109. The resulting pulse produced at the output Q1 of the multivibrator 203 is transmitted to the R4,C3 input of the DTMF signal generator 22 to transmit a corresponding DTMF tone to the entire system. Only brief burst of this DTMF tone is transmitted to the system at repetitive intervals, because the DTMF signal generator is connected to the transmit side of the system line 11 for only brief repetitive intervals.

More particularly, at the same time the multivibrator 203 is triggered to produce a positive pulse at the output Q1, it also produces a corresponding negative pulse at the output $\overline{Q}$, and this latter pulse is passed through the AND gates 237 and 238 and OR gate 239 to the transmit-relay transistor TR4. This de-energizes the relay 25 for only a brief time interval corresponding to the width of the output from the multivibrator 203, which is typically about 10 to 20 milliseconds. Thus, every station that is already cut through to the system at the time the local override option is exercised hears a brief burst of the R4,C3 DTMF tone to alert those stations that an overrider is present.

To repeat this brief burst of DTMF tone at repetitive intervals, the pulse produced at the output Q1 of the multivibrator 203 is applied to the input S2 of that dual multivibrator. This input S2 is triggered by the negative-going edge of its input pulse to produce a negative pulse at the output $\overline{Q2}$, which is normally high to enable the AND gate 246. The negative pulse from $\overline{Q2}$ momentarily disables the gate 246, but the positive-going edge of that pulse then re-enables the gate 246 and re-triggers the input S1 of the multivibrator 203 to produce another pulse at the output Q1. Thus, another burst of the R4,C3 DTMF tone is generated, and the cycle repeats itself once again, i.e., every 2 seconds.

A subscriber coming off-hook into a busy system may also exercise a "system override" option, which not only gives him access to the system but also "dumps" or clears every station already in the system. This option is elected by depressing an "SOR" pushbutton 247 on the subscriber's handset. This presents a positive-going signal to OR gates 105 and 154, and the resulting output of the OR gate 105 has the same effect on the multivibrator 104 as an on-hook condition on the M lead, namely, the production of a pulse at the output Q2. This pulse is passed through the AND gate 153, which is enabled by the output of gate 154. The output of the gate 153 is applied to the "system clear" input to the code generator 61, thereby producing a "system clear" code signal which causes the DTMF signal generator to transmit the same signal in DTMF form to all the other stations in the system. This DTMF signal produces an output pulse from the gate 194 at each receiving station, and the negative edge of this pulse triggers the multivibrator 143 to produce a pulse at output Q2, thereby resetting the transponders throughout the system so that the entire system is cleared for an emergency situation.

We claim as our invention:

1. A dual tone multiple frequency (DTMF) signal receiver for telephone systems, said receiver comprising an amplifier with automatic gain control for receiving and amplifying DTMF and audio signals, a series of bandpass and notch filters receiving the output from said amplifier for producing bandpass and notch outputs in response to the DTMF frequencies, the first filter in said series receiving the output from said amplifier and each succeeding filter in said series receiving the notch output of the preceding filter with each filter being tuned to a prescribed DTMF frequency so that the notch outputs of said filters successively eliminate signals with the prescribed DTMF frequencies, the bandpass output of each of said filters including only the particular DTMF frequency to which that filter is tuned, a plurality of detection means each receiving the bandpass output from one of said filters for producing signals representing the presence or absence of a signal of each prescribed DTMF frequency in the output from said amplifier, a DTMF decoder receiving the signals from said detection means and producing output signals in response to the simultaneous detection of preselected pairs of the prescribed DTMF frequencies, A voice guard circuit receiving the notch output from the last filter in said series and comparing the amplitude of that notch output with a predetermined threshold level for producing a disable signal whenever the amplitude of said notch output is greater than said predetermined threshold level, said disable signal being supplied to said DTMF decoder for disabling the production of said output signals by said decoder and thereby preventing the detection of invalid DTMF signals.

2. A dual tone multiple frequency (DTMF) signal receiver as set forth in claim 1 wherein each of said filters is tuned to a prescribed DTMF frequency, and each filter in said series receives the notch output of the previous filter so that the prescribed DTMF frequencies are progressively removed from the total noise band, with the remaining frequency band in the notch output of the last filter becoming the voice guard band.

3. A dual tone multiple frequency (DTMF) receiver as set forth in claim 1 wherein each of said detection means comprises means for rectifying the bandpass output of the associated filter, a d-c. reference voltage source, and a comparator for producing a predetermined d-c. output when the rectified bandpass output exceeds the reference voltage.

* * * * *